(12) United States Patent
Patel et al.

(10) Patent No.: US 11,966,420 B2
(45) Date of Patent: Apr. 23, 2024

(54) DECENTRALIZED DATA BROADCASTING IN A DISTRIBUTED NETWORK

(71) Applicant: Evernorth Strategic Development, Inc., St. Louis, MO (US)

(72) Inventors: Harshil Patel, Oxford, NJ (US); Remik Mueller, North Granby, CT (US); Jonathan Clark, Tolland, CT (US); Prashant M. Damania, Shelton, CT (US); Michael Chen, Oak Ridge, NJ (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 87 days.

(21) Appl. No.: 17/555,645

(22) Filed: Dec. 20, 2021

(65) Prior Publication Data

US 2023/0195754 A1  Jun. 22, 2023

(51) Int. Cl.
  *G06F 16/28* (2019.01)
  *G06Q 30/0283* (2023.01)

(52) U.S. Cl.
  CPC ....... *G06F 16/285* (2019.01); *G06Q 30/0283* (2013.01)

(58) Field of Classification Search
  CPC .......................... G06F 16/285; G06Q 30/0283
  See application file for complete search history.

(56) References Cited

U.S. PATENT DOCUMENTS

| | | |
|---|---|---|
| 8,234,159 B2 | 7/2012 | Heiser, II |
| 8,935,275 B2 | 1/2015 | Rathod |
| 9,002,728 B2 | 4/2015 | Carpenter |
| 9,984,156 B2 | 5/2018 | Peckover |
| 10,204,152 B2 * | 2/2019 | Kataria ................ G06F 40/169 |
| 10,417,340 B2 | 9/2019 | Applegate |
| 10,657,560 B2 | 5/2020 | Shariff |

(Continued)

FOREIGN PATENT DOCUMENTS

JP  2003099618 A  *  4/2003

OTHER PUBLICATIONS

Lindsay Kolowich Cox, "How to Send Group Direct Messages on Twitter", https://blog.hubspot.com/marketing/twitter-group-direct-message (Year: 2015).*

*Primary Examiner* — Mark D Featherstone
*Assistant Examiner* — Brooks T Hale
(74) *Attorney, Agent, or Firm* — Miller Johnson

(57) ABSTRACT

A method for publishing a data message to shared storage includes receiving an action targeting a user associated with a distributed network having a plurality of service providers. Each service provider includes a private storage system and has access to a shared storage system. The method also includes parsing data elements of the action into a first set of data elements and a second set of data elements. The method further includes classifying the first set of data elements into categories of a data taxonomy. The method additionally includes generating a message for the action where the message includes the first set of data elements. The method also includes publishing the message to the shared storage system using a first identifier indicating the user and a second identifier that indicates that a respective service provider associated with the action has authority to publish the message to the shared storage system.

22 Claims, 12 Drawing Sheets

(56) References Cited

U.S. PATENT DOCUMENTS

| | | | |
|---|---|---|---|
| 2009/0048986 A1* | 2/2009 | Anderson | G06Q 10/063 705/400 |
| 2013/0132515 A1* | 5/2013 | Mostafa | H04L 67/60 709/217 |
| 2014/0067539 A1 | 3/2014 | Burt | |
| 2014/0229281 A1 | 8/2014 | Zimmerman, Jr. | |
| 2014/0358713 A1* | 12/2014 | Prakash | G06Q 30/06 705/26.3 |
| 2015/0186937 A1 | 7/2015 | Lui | |
| 2015/0294359 A1 | 10/2015 | Burt | |
| 2020/0274856 A1* | 8/2020 | Penton | H04L 63/0428 |

* cited by examiner

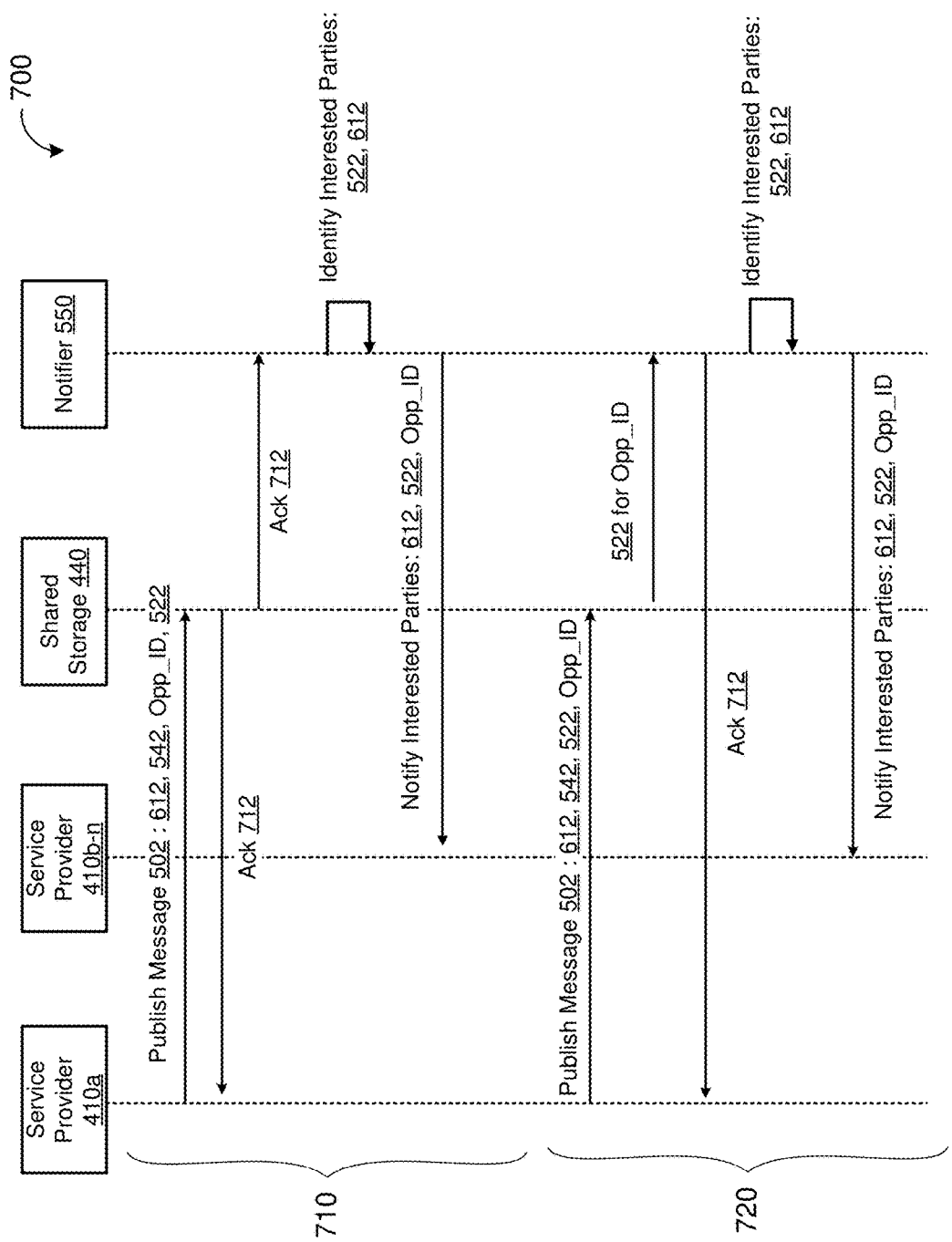

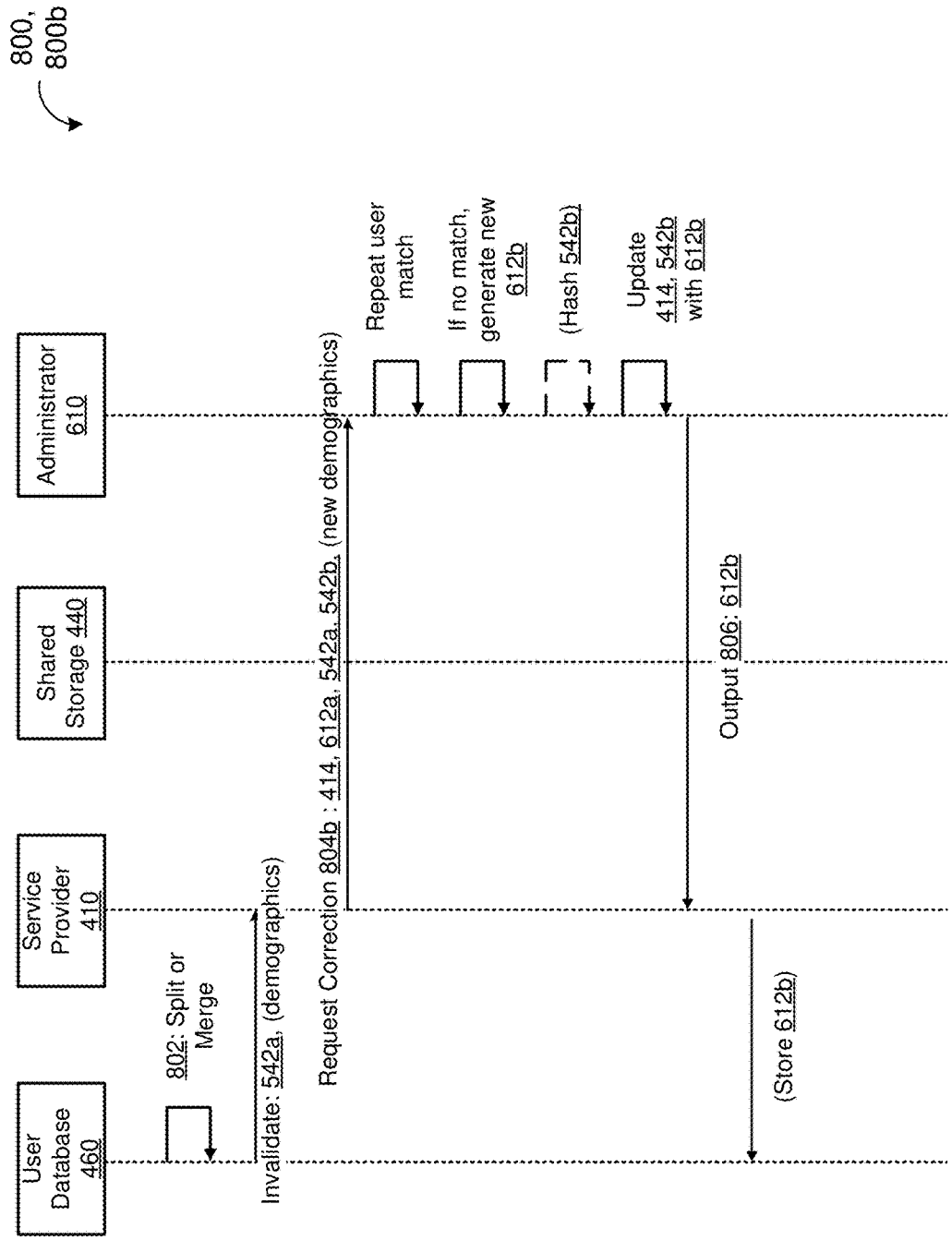

DECENTRALIZED DATA BROADCASTING IN A DISTRIBUTED NETWORK

FIELD

The present disclosure relates to decentralized data broadcasting in a distributed network.

BACKGROUND

Networked ecosystems have become more common to provide various service platforms for consumers. Each network may include multiple computing nodes capable of generating data that concerns a user of the network and/or particular computing nodes. As these networks become more complicated, the management of data for the network can proportionally become more complicated. For example, each computing system in the network produces data in a different manner causing varying degrees of accessibility for other computing systems. Meaning that, when data is produced in the network by one entity that may be of value to another entity, the interested entity may have difficulty utilizing the data even though the entities are part of the same network. This may be especially true when network entities operate somewhat autonomously providing services to a user because each entity may capture some portion of service-providing data relating to the user without fully realizing the entirety of the user data available to the network as a whole.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a computerized method (or, more generally, a method) for publishing a data storage message to persistent shared data storage. The method includes receiving an action targeting a user associated with a distributed network. The distributed network includes a plurality of service providers and a persistent shared data storage system. Each service provider of the plurality of service providers includes a private data storage system and has access to the persistent shared data storage system. The method also includes parsing data elements of the action into a first set of data elements corresponding to a first category of data elements and a second set of data elements corresponding to a second category of data elements. The method further includes classifying the first set of data elements into categories of a data taxonomy specified by the persistent shared data storage system. The method additionally includes generating a data storage message for the action where the data storage message includes the first set of data elements classified into the categories of the data taxonomy. The method also includes publishing the data storage message to the persistent shared data storage system using a first identifier indicating the user and a second identifier that indicates that a respective service provider associated with the action has authority to publish the data storage message to the persistent shared data storage system.

In some examples, the method further includes communicating, to an entity facilitating the persistent shared data storage system, a service provider identifier associated with the respective service provider and the first identifier and, in response to the entity determining that the user indicated by the first identifier fails to be enrolled in the distributed network, receiving the second identifier where the second identifier further indicates that the respective service provider has the authority to publish to the persistent shared data storage system on behalf of the user. In these examples, the first identifier may also indicate an association between the respective service provider and the user.

In some implementations, the method additionally includes generating a second data storage message for the action. Here, the second data storage message includes the second set of data elements. In these implementations, the method also includes communicating the second data storage message to the private data storage system associated with the respective service provider.

In some implementations, the method also includes assigning an action identifier to the action. Here, the data storage message further includes the action identifier.

Another aspect of the disclosure provides a system for publishing a data storage message to persistent shared data storage. The system includes data processing hardware and memory hardware. The memory hardware is configured to store instructions that, when executed by the data processing hardware, cause the data processing hardware to perform operations. The operations include receiving an action targeting a user associated with a distributed network. The distributed network includes a plurality of service providers and a persistent shared data storage system. Each service provider of the plurality of service providers includes a private data storage system and has access to the persistent shared data storage system. The operations also include parsing data elements of the action into a first set of data elements corresponding to a first category of data elements and a second set of data elements corresponding to a second category of data elements. The operations further include classifying the first set of data elements into categories of a data taxonomy specified by the persistent shared data storage system. The operations additionally include generating a data storage message for the action where the data storage message includes the first set of data elements classified into the categories of the data taxonomy. The operations also include publishing the data storage message to the persistent shared data storage system using a first identifier indicating the user and a second identifier that indicates that a respective service provider associated with the action has authority to publish the data storage message to the persistent shared data storage system.

In some examples, the operations further include communicating, to an entity facilitating the persistent shared data storage system, a service provider identifier associated with the respective service provider and the first identifier and, in response to the entity determining that the user indicated by the first identifier fails to be enrolled in the distributed network, receiving the second identifier where the second identifier further indicates that the respective service provider has the authority to publish to the persistent shared data storage system on behalf of the user. In these examples, the first identifier may also indicate an association between the respective service provider and the user.

In some implementations, the operations additionally include generating a second data storage message for the action. Here, the second data storage message includes the second set of data elements. In these implementations, the operations also include communicating the second data storage message to the private data storage system associated with the respective service provider.

In some implementations, the operations also include assigning an action identifier to the action. Here, the data storage message further includes the action identifier.

Implementations of either the method or the system of the disclosure may include one or more of the following features. In some examples, the first identifier is issued by the respective service provider. In some implementations, the data storage message published to the persistent shared data storage system is broadcasted to each service provider of the plurality of service providers enrolled to receive data storage messages published to the persistent shared data storage system targeting the user. In some configurations, the action corresponds to a cost-reducing action for the user. Additionally or alternatively, the action corresponds to a proposed improvement in services provided to the user by the respective service provider. In some examples, the action corresponds to an interaction between the respective service provider and the user. The action may be performed in response to a prior action provided to the user by the respective service provider.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 7 is a flow diagram of an example process for sharing data within the systems of FIGS. 4A and 4B.

FIGS. 8A and 8B are flow diagrams of an example data correction processes when broadcasting data within the systems of FIGS. 4A and 4B.

In the drawings, reference numbers may be reused to identify similar and/or identical elements.

DETAILED DESCRIPTION

Introduction

Figure 1:
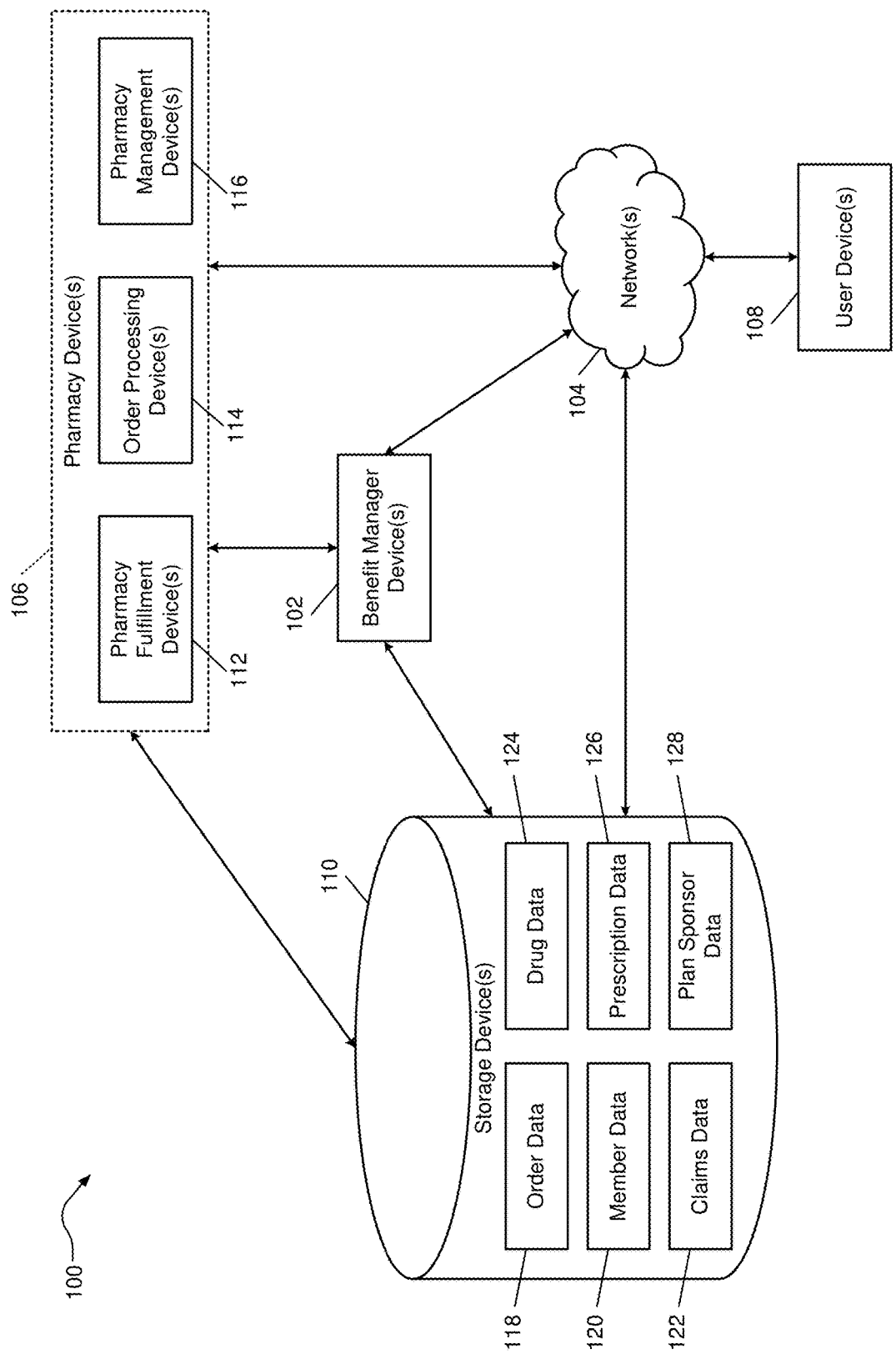
FIG. 1 is a functional block diagram of an example system including a high-volume pharmacy.

Unfortunately, healthcare ecosystems suffer from the same issues of other networked ecosystems. Healthcare ecosystems often consist of a complex network of service providers engaged by customers to manage the health of a customer through the customer's lifetime. With each service provider capturing a myopic piece of health data based on the services it providers to customers (also referred to as consumers), each service provider holds a piece of information that can be leveraged to provide the network with context about the consumer. Yet, often many networks lack the ability to allow one service provider to share these pieces of information or, at the very least, share them in an efficient, predictable, and/or affordable manner with other service providers of the network. Instead, service providers in a network tend to be siloed systems trying to understand health data for a consumer with the individual pieces of information they possess rather than acquiring further context from other service providers in the network. In this respect, networks that revolve around a consumer, such as a healthcare network, would likely better serve the consumer if the network had a streamlined process for sharing consumer information.

To address some of these issues, the distributed network employs a broadcaster that operates to disseminate various consumer data in a decentralized manner. By operating in a decentralized architecture, the broadcaster can allow the network to avoid sharing data in ways that involve middlemen and lengthy sharing procedures. Furthermore, to be conscientious of the healthcare ecosystem, the broadcaster is capable of sharing data between service providers in a standardized format with secure transmission to safeguard (e.g., to mark) sensitive information. This approach may also prevent or minimize any over-sharing of data because the broadcaster operates in conjunction with an enrollment-based persistent storage system where enrolled service providers can access the entire data context for a consumer without having to reconstruct this context for themselves to cater to consumer needs or preferences.

Furthermore, the functionality of the broadcaster supports ongoing trends in network ecosystems. Namely, it is not uncommon for consumers in a network of service providers to change aspects of the network. That is, in the age of information, consumers may construct networks with a la carte service providers based on the knowledge and information accessible to consumers about service providers today. For instance, the consumers of today tend to have greater access to feedback about service providers through reviews and online information than the consumers of yesterday. Healthcare buying behavior has followed this trend for both large and small markets such that it is not uncommon for healthcare ecosystems to contract with multiple care supplies instead of a single large health service company. With this being the current and evolving state of networked ecosystems, the broadcaster is configured to promote efficient collaboration between any and all service providers of a network.

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
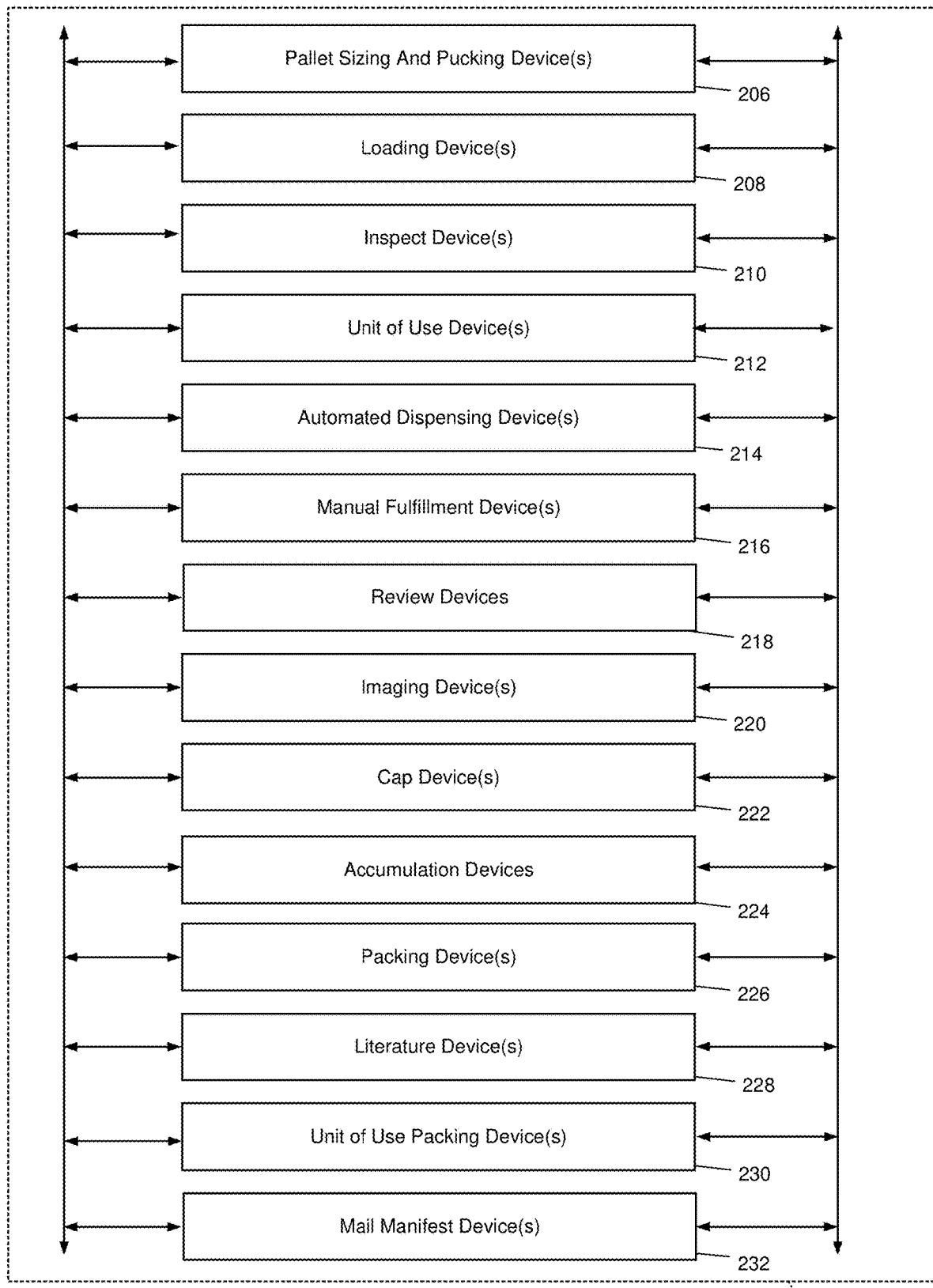
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
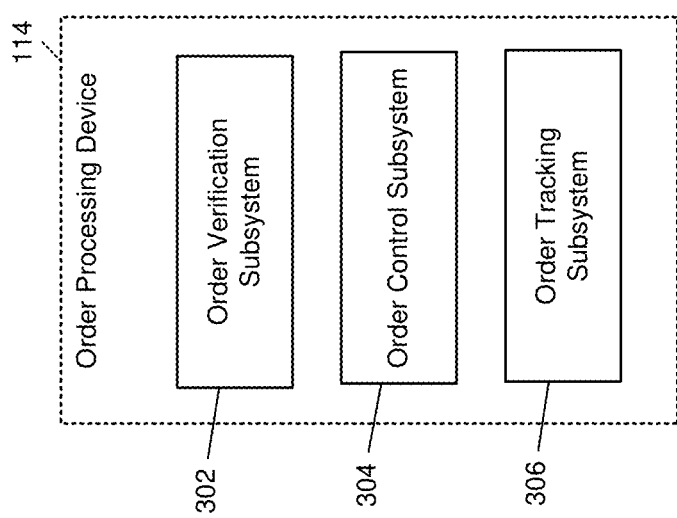
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Data Broadcasting

Figure 4A:
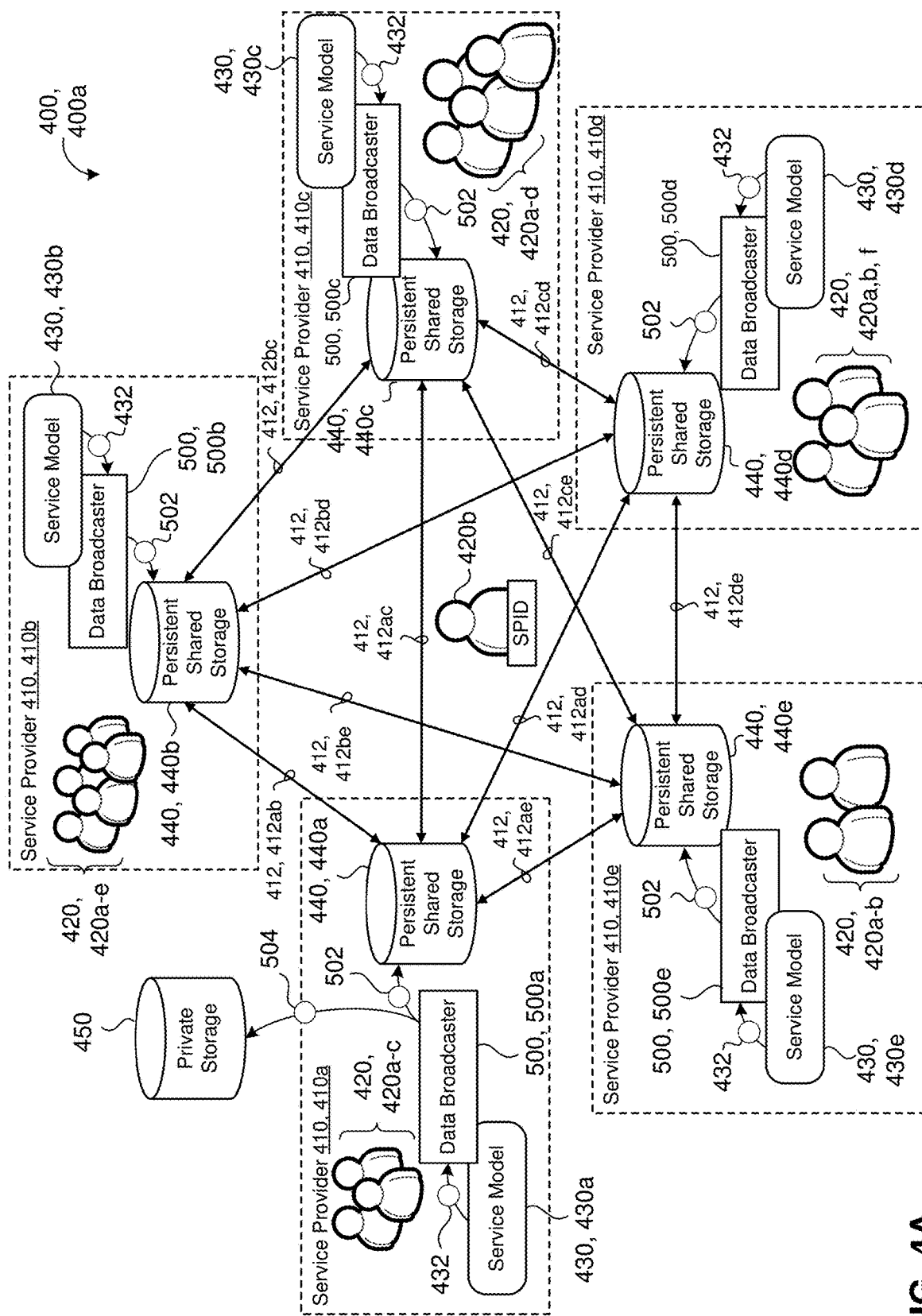
FIGS. 4A and 4B are schematic views of example distributed networks for broadcasting data.
Figure 4B:
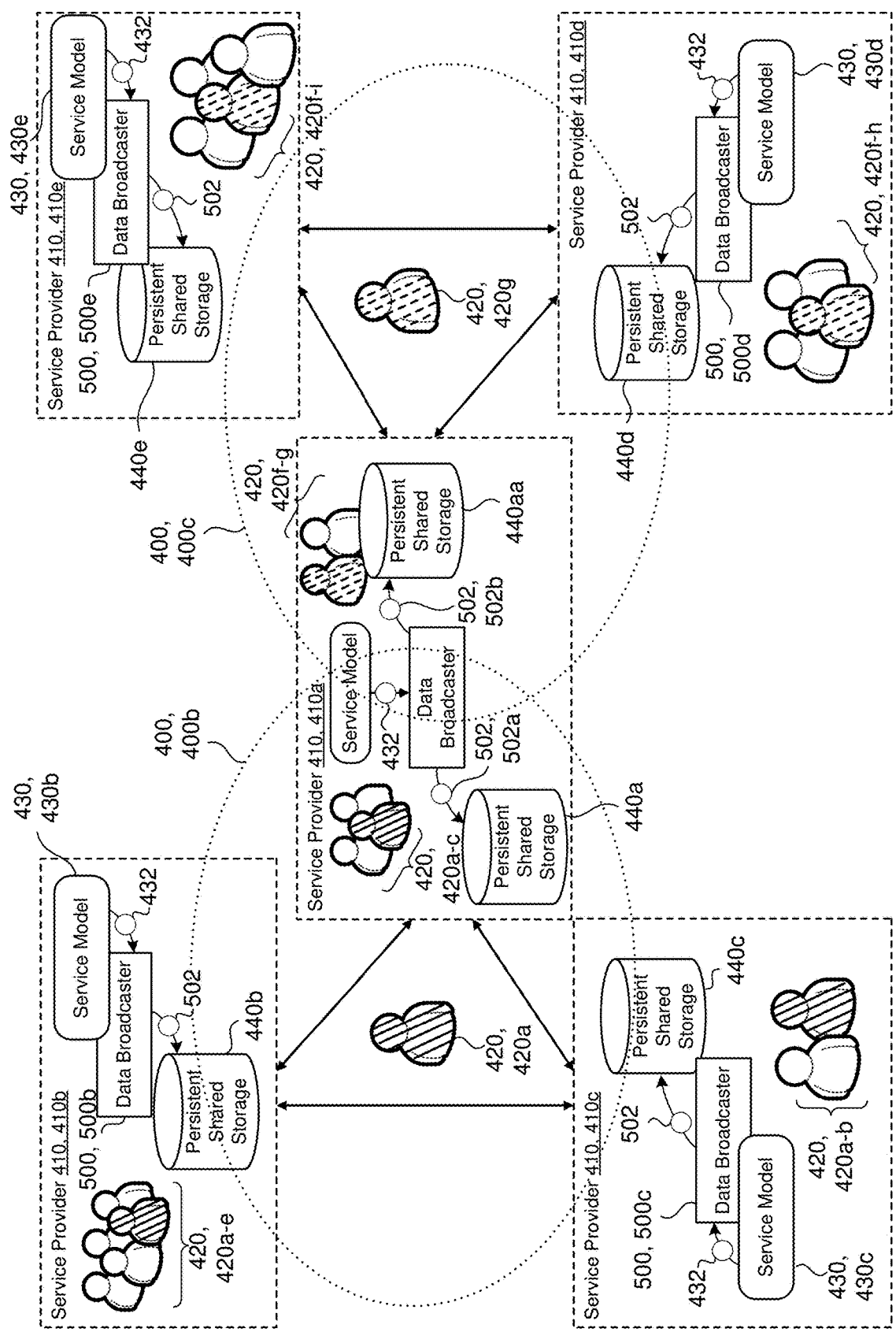

FIGS. 4A and 4B are examples of distributed networks 400, 400a-b for broadcasting user data. The distributed network 400 generally includes a plurality of service providers 410, 410a-n where each service provider 410 may have one or more associated service users 420, 420a-n (also referred as a user 420). A service user 420 broadly refers to some recipient capable of receiving the service provided by the service provider 410 (e.g., a patient, a customer, a consumer, an insured, etc.). For instance, when the service provider 410 is a pharmacy, the user 420 is a customer. Yet when the service provider 410 is a hospital, doctor, or dentist, the user 420 is a patient. In this respect, in the network 400, a single user 420 may be a patient to one service provider 410 (e.g., a doctor's office) yet a customer or consumer of another service provider 410 (e.g., a pharmacy).

The plurality of service providers 410 may form the distributed network 400 to provide an array of services (e.g., linked or interconnected services). For instance, a payer, or financier of healthcare services, may form a distributed network 400 with some number of hospitals, rehab center(s), clinics, pharmacies, dentists, and optometrists to provide healthcare services to a user 420 or set of users 420 associated with the distributed network 400. The network relationship may be formed by contractual arrangements. As shown in FIGS. 4A and 4B, each service provider 410 may have a different number of users 420 that utilize the provider's 410 services. In other words, one service provider 410 may share the exact same users 420 another service provider 410 or share some of its user 420 with another service provider 410. To illustrate, FIG. 4A depicts a first service provider 410, 410a sharing all three of its users 420, 420a-c with a second service provider 410, 410b that has five users 420a-e. As an example, one healthcare plan may include dental benefits such that all the users of a dental service provider 410 (e.g., the first service provider 410a) are also users 420 of a hospital service provider 410 (e.g., the second service provider 410b), but some users 420 of the hospital service provider 410 (e.g., the second service provider 410b) may not be users 420 of the dental service provider 410 (e.g., on a plan that does not offer dental services).

Unfortunately, since it is common for users 420 to be shared among the providers 410 of the network 400, there may be issues coordinating between the service providers 410. As an example, one service provider 410 offers one of its users 420 a cost savings opportunity by recommending the user 420 switches to a generic drug. In this situation, because of the outstanding cost savings opportunity, another service provider 410 may want to avoid offering a competing cost savings opportunity or a similar, but lessor cost savings opportunity. Here, the other service provider 410 may waste time or resources offering the lessor cost savings opportunity to the user 420 because the service provider 410 was unaware of the greater cost savings offer.

As part of this coordination, one or more service providers 410 may wish to understand or to track how a particular user 420 interacts with a given service provider 410 or set of service providers 410. For example, if a user 420 receives an offer to guide the user 420 to a particular outcome (e.g., to switch to a generic drug form), another service provider(s) 410 may be interested in knowing if or how the user 420 acts in relation to the offer, especially when the user 420 also uses the services of the other interested service provider 410. A service provider 410 may have this interest because knowing or understanding the behavior of a user 420 may be leveraged by that service provider 410 for future opportunities and/or interactions or may allow the service provider 410 to more congruently tailor their services to the user 420. Therefore, without some degree of concert between the service providers 410, each service provider 410 is instead responsible for tracking or monitoring their own service providing behavior with respect to the user 420; likely resulting in a smaller volume of valuable user data when compared to the volume of user data available to multiple service providers 410.

Yet the service providers 410 are not the only entity that can benefit from network coordination between the service providers 410. The users 420 can also receive benefits if a network 400 becomes more synchronized or more understanding of how a user 420 behaves. In particular, the user 420 would prefer that he or she is not inundated with similar opportunities or overwhelmed by too many opportunities. Another issue for the user 420 is that the user 420 may lose trust in the network 400. This may occur when the user 420 perceives or identifies that the service providers 410 are failing to act together especially when service providers 410 of a network 400 provide complimentary or interconnected services. In other words, the user 420 may lose confidence in a pharmacy if the pharmacy lacks efficient coordination with a doctor's office or a diagnostic laboratory. This trust may be especially important in networks 400 that revolve around user care where a user 420 relies on expertise that intimately affects his or her well-being. In this respect, the user 420 is not going to want to be a part of a network 400 that lacks a user-centric coordination.

To compound these issues, service users 420 today often leverage available information to learn about either service providers 410 that the user 420 currently uses or other service providers 410 that the user 420 could use as a replacement or an alternative to its current service provider(s) 410. In this respect, it is not unrealistic for networks 400, service providers 410, and the users 420 involved to be in a state of flux (i.e., a dynamic state). In other words, the service providers 410 involved in a network 400 may change. The users 420 that are using a particular service provider 410 may switch service providers 410 or networks 400 entirely. For instance, if a network 400 corresponds to a geographic region (e.g., the network 400 is for Michigan healthcare providers), users 420 may be entering or exiting the network 400 as they move and relocate. From this perspective, data for how a user 420 behaves may be lost or fragmented due to these dynamic changes. For instance, when a user 420 becomes associated with a service provider 410, the service provider 410 generates a unique identifier for the user 420. If the user 420 then subsequently ceases his or her association with the service provider 410, the service provider 410 may remove the unique identifier or perform some operation to identify the user 420 as inactive. If that same user 420 was to later return to the service provider 410 or to the network 400 of the service provider 410, the user 420 may be assigned a new identifier such that service providers 410 would be unable to leverage the data about the user 420 from the user's previous involvement with the network 400 or service provider 410.

Another aspect that becomes difficult in a network 400, such as a healthcare network, is that user data is often abstracted to remove any identifiers that could indicate the identity of the user 420. Although this ensures user privacy, it also can make it difficult to understand that one user 420 is the same as another user 420. For example, when the user 420 belongs to at least two service providers 410. The first service provider 410 unbeknownst to the second service provider 410 may refer to the user 420 by a first unique identifier (e.g., issued by the first service provider 410) while the second service provider 410 may refer to that same user 420 as a second unique identifier (e.g., issued by the second service provider 410). Here, if systems were to coordinate between the first service provider 410 and the second service provider 410, these systems may lack information to identify that the first and second unique identifier refer to the same user 420; preventing the systems from associating all captured data from the user together to provide a complete user data set. For reasons such as this, the network 400 architecture performs data correction processes as described in FIGS. 8A and 8B.

In a similar respect, coordination often proves difficult because systems used by service providers 410 may vary and data generated by one service provider 410 may have compatibility issues with data from another service provider. Moreover, with larger networks 400, having multiple service providers 410 tends to amplify these compatibility issues. For instance, FIGS. 4A and 4B illustrate one potential source of incompatibility. In FIGS. 4A and 4B, each service provider 410 includes a service model 430. The service model 430 is capable of receiving a set of data points about a particular user 420 and generating an action 432 specific to the user 420. The type of actions 432 that occur within a network 400 may vary, but the service model 430 or, more generally, the service provider 410 may generate actions 432 referred to as opportunities 432, 432o. An opportunity refers to a specific action that has been identified (e.g., by the service provider 410) to guide or to steer a user 420 toward a particular outcome. In a healthcare network 400, the set of data points that generate a particular action 432 may correspond to medical observations (e.g., analytical data such as lab results). When a particular set of data points about the user 420 combine together, the data points may indicate a particular fact about the user 420. To illustrate, if the user 420 has a certain Blood Glucose reading and this reading combines with the age and sex of the user 420, these points of data would indicate a fact about whether the glucose level is either high or low. Although this is a relatively simple scenario, service models 430 can be built of increasing complexity to model all types of data points for different correlations and analytical patterns. Service providers 410 may spend significant amounts of time and/or resources constructing service models 430 to identify facts or to generate actions 432 based on captured data points. In this respect, facts derived by a model 430 and subsequently any recommended action 432 stemming from the model 430 is often proprietary to the service provider 410. Even the underlying data point(s) that forms a fact or an action 432 may be proprietary. For instance, the data point is a medical observation from a proprietary piece of equipment or process.

With each service provider 410 using potentially different or proprietary system(s) (e.g., models 430) to provide services to the user 420, the data generated by service providers 410 is not uniform or, at least, often not in a uniformly readable or communicable state. Without uniformity, one service provider 410 may not understand or be able to interpret data from another service provider 410; causing the sharing of data between service providers 410 to be difficult. Therefore, there is a complex need to broadcast or to share data among a network 400 in a manner that promotes data compatibility and respects user privacy all while not impinging proprietary interests of the service providers 410.

To address some of these issues with user data sharing, the network 400 includes a data broadcaster 500 (also referred to as a broadcaster 500). More specifically, each service provider 410 may include their own broadcaster 500. A broadcaster 500 generally functions as a manager that coordinates data standardization and/or data flow to a private storage system(s) and a shared storage system. The broadcaster 500 is configured to broadcast or publish messages about users 420 to a persistent shared storage 440 for the network 400. Unlike other data sharing interfaces, the broadcaster 500 can focus on the process of communicating and storing data corresponding to actions 432. Since actions 432 often stem from facts that tend to be proprietary service provider information and also refer to a user 420, the broadcast 500 is setup to parse and classify data elements of an action 432 to generate messages in a form that can be interpreted by other service providers 410; thus, allowing for greater collaboration. With the configuration of a respective broadcaster 500 at each service provider 410, the broadcaster 500 also allows for decentralized collaboration where actions 432 can be, in some senses, crowd-sourced between the service providers 410 of a network 400.

As previously stated, there may be different types of actions, but an action 432 generally refers to a representation (e.g., a data description) of a specific performance or intended performance of a target user. Two types of actions 432 that the broadcaster 500 accommodates for are opportunity actions 432o and interactions 432, 432i. An opportunity action 432o is a specific action 432 that has been generated to guide or to steer a target user 420 toward a particular outcome. For instance, an opportunity action 432o is a cost-reducing opportunity for the user 420 or a proposed improvement in some service(s) or good(s) provided to the user 420 by a given service provider 410. In some examples, an opportunity action 432 includes a status state where the status state tracks or identifies the target user's interaction with the opportunity action 432o. Some examples of status states include: "identified" to indicate the existence of an opportunity action 432o for the target user; "offered" to indicate that the opportunity action 432o has been presented to the target user in some manner (e.g., emailed, mailed, hand-delivered, etc.); "viewed" to indicate that the target user has seen the opportunity action 432o; "rejected" to indicate that the target user has taken some affirmative action to deny opportunity action 432o from steering the target user toward the intended outcome; "completed" to indicate that the user 420 has reached the intended outcome or that opportunity action 432o has reached its end of life; and "expired" to indicate that the opportunity action 432o is no longer available to the user 420.

An interaction 432i refers to a representation that characterizes the effect of one entity on another entity. For example, interactions 432i often characterize the effect or relationship between a service provider 410 and a user 420. Some interactions 432i represent the manner in which a user 420 reacted to the service provider 410 in response to an opportunity 432o. Interactions 432i may characterize or represent a physical effect, a virtual effect, an electronic effect, or some other form capable of embodying an effect.

FIG. 4A is an example of single distributed network 400a and more particularly a decentralized distributed network. In this example, each node of the distributed network 400a corresponds to a service provider 410. Although the number of service providers 410 may vary (e.g., from more or less than shown in FIGS. 4A and 4B), FIG. 4A depicts five service providers 410a-e where each service provider 410 includes a broadcaster 500 (e.g., broadcasters 500, 500a-e). In addition to the broadcaster 500, each service provider 410 includes a plurality of users 420 associated with the service provider 410. For instance, the first service provider 410a has three users 420a-c. The second service provider 410b has five users 420a-e. The third service provider 410c has four users 420a-d. The fourth service provider 410d has three user 420a,b,f. The fifth service provider 410e has two users 420a, 420b. In some implementations, such as FIGS. 4A and 4B, each service provider 410 is associated with a service model 430 that is configured to generate or recommend actions 432 (e.g., opportunity actions 432o). Even though FIG. 4A illustrates a decentralized network 400 where each node includes its own broadcaster 500 and a service model 430, other network configurations are possible where a broadcaster 500 or service model 430 is shared between one or more service providers 410. More specifically, when each node includes its own set of components (e.g., its own broadcaster 500, service model 430, and shared storage 440), the network configuration is distributed and also completely decentralized in that no single node controls or dictates network processes. This is in contrast to other configurations where a node may operate as a type of master node that facilitates or dictates processes for other nodes.

Besides service provider nodes, the network 400 includes one or more persistent shared storage systems 440, 440a-n (also referred to as shared storage 440). Persistent shared storage 440 refers to a data storage configuration where data that is written to this storage becomes immutable. Moreover, by being "shared" storage, the data stored within the shared storage 440 is accessible to all network participants (i.e., service providers 410) who desire access or are authorized to be given access.

In some implementations, such as FIGS. 4A and 4B, the shared storage 440 is configured such that the service provider 410 associated with a respective shared storage 440 has access to its stored data (e.g., read and write capabilities), while the broadcast or dissemination of the stored data occurs based on permission. For instance, FIGS. 4A and 4B illustrate that each service provider node includes its own copy of the shared storage 440a-e. Here, other nodes learn about data publications to a particular copy of shared storage 440 based on the permission relationships these other nodes have with that particular shared storage 440. In a permission-based approach, the shared storage 440 may have multiple levels of permission (i.e., different levels of permission). For instance, the shared storage is configured with access at two levels, a service provider level and a user level. On the service provider level, one service provider 410 may choose to enroll or to receive permission to receive data stored to the shared storage 440 associated with another particular service provider 410. That is, a service provider 410 specifies another service provider 410 that it seeks access to obtain data from. For example, the first service provider 410a enrolls to obtain to data stored by the third service provider 410c and the fourth service provider 410d.

The first service provider 410a may additionally or alternatively enroll or receive permission (e.g., data dissemination permission) at the service user level. In this respect, the first service provider 410a may enroll to obtain data corresponding to the second service user 420b (e.g., since the second service user 420b is a user of the first service provider's services). Meaning that, if the fourth service provider 410d writes data to the shared storage 440d regarding the second service user 420b, the first service provider 410a, enrolled to obtain data corresponding to the second service user 420b, would be able to obtain (e.g., by broadcast/dissemination) the data stored by the fourth service provider 410d. This user level permission is in contrast to the service level permission because the first service provider 410a receives data regarding the second service user 420b from the fourth service provider 410d based on the enrollment for the second service user 420b (even though the first service provider 410a is not enrolled at the service level with the fourth service provider 410d).

To illustrate the combination of user level access and service provider level access, FIG. 4A depicts the second user 420b at the center of the network 400a. FIG. 4A shows the second user 420b in the center of the network 400a to indicate that the shared connections 412, 412a-n are with respect to the second user 420b. In this example, the second user 420b uses each of the service providers 410. Therefore, in this example, each service provider 410 requests and receive access to the shared storage 440 for the second user 420b as shown by a shared connection 412. Each shared connection 412 includes a letter combination to designate the service providers 410 that are sharing with each other regarding the second user 420b. For instance, the first service provider 410a accesses data stored to the shared storage 440 from the second service provider 410b about the second user 420b and vice versa as shown by the shared connection 412ab where the letter "a" of "ab" corresponds to the first service provider 410a and the letter "b" of "ab" corresponds to the second service provider 410b.

As described, a service provider 410 may enroll in different manners depending on what information interests the service provider 410. If the service provider 410 is interested in another particular service provider 410 (e.g., all information published by a particular service provider 410), the service provider 410 may enroll to have access to only that particular service provider 410. On the other hand, if the service provider 410 knows the precise user 420 that the service provider 410 is interested in, the service provider 410 may enroll at a user level where the service provider 410 designates one or more particular users 420. As another option, a service provider 410 may enroll to receive access or information regarding particular actions 432 (e.g., opportunity actions 432o and/or interactions 432) or designate particular types of actions 432. When the service provider 410 enrolls in a particular type of action 432, the type of action 432 may refer to the type of action attribute included in the data taxonomy 522 of the shared storage message 502. A service provider 410 may therefore enroll in any combination of service provider(s) 410, users 420, and/or actions 432 or types of actions 432.

In some examples, when the broadcaster 500 writes data to the shared storage 440, the broadcaster 500 writes the data sequentially (e.g., in a data chain) such that a second data record is appended to a first data record. By writing data sequentially into the shared storage 440, service providers 410 with access to the data can inherently gain an understanding of the timing and sequence of data transactions. Moreover, by appending one record to the next record, this data writing/storage sequence prevents data blocks from being altered by the insertion of data between blocks or records. In addition, with the data stored in each storage record being immutable once written to storage, the data storage pattern can allow a service provider 410 to access (e.g., to view/read) the sequence of data storage transactions to identify any and/or all data transactions corresponding to a particular service provider 410 and/or service user 420. For instance, although the first service provider 410a may have recently enrolled with the shared storage 440 for access to data regarding the second user 420b, the first service provider 410a, once given access, is able to view the entire timeline of data storage transactions; allowing the first service provider 410a to identify actions 432 involving the second user 420b even at a time prior to the first service provider's enrollment. In various implementations, the shared storage 440 may be referred to as a permissioned blockchain.

Since data corresponding to a user 420 often may contain sensitive information to the user 420 itself or to the service provider 410, the broadcaster 500 also communicates with private storage 450 in addition to the shared storage 440. In other words, the broadcaster 500 is configured to parse user-related data (e.g., actions 432) into data elements and to direct these data elements for storage at either the private storage 450 or the shared storage 440. In this respect, although only one private storage 450 is depicted between FIGS. 4A and 4B, each service provider 410 may be associated with private storage 450 in communication with the broadcaster 500. Here, by being able to parse an action 432 into data elements, the broadcaster 500 can prevent certain user-based information from being immutably stored in the shared storage 440. For instance, when the network 400 corresponds to a healthcare network, an action 432 may include data elements that characterize personal health information or personal information about a specific user 420. Instead of allowing these types of data elements to persist in immutable shared storage, the broadcaster 500 can instead store these data elements in the private storage 450.

Moreover, with two distinct data storage systems (i.e., the shared storage 440 and the private storage 450), the broadcaster 500 is capable of managing the shared storage 440 in a manner that ensures that data being shared from the shared storage 440 is lightweight. Since each service provider 410 is capable of receiving access to the shared storage 440, the size of records in the shared storage 440 can inherently impact the speed or resources (e.g., computing time) to write transactions to the shared storage 440 and to read transactions from the shared storage 440. With at least two data storage systems, the broadcaster 500 can be programmed with functionality (e.g., rules) that offloads particular data elements to the private storage 450 and to repackage data elements of an action 432 in order to generate records with a minimal amount of information on the shared storage 440. With this approach, records stored in the shared storage 440 may be optimized for the sharing of actions 432 such as opportunity actions 432o and interactions 432i between service providers 410. This means that the broadcaster 500 is able to generate a first data storage message 502 for storing data at the shared storage 440 as well as a second data storage message 504 for storing data at the private storage 450.

FIG. 4B is an example of broadcasting data in an environment with multiple overlapping networks 400, 400b-c, a first network 400, 400b and a second network 400, 400c. In this example, the first service provider 410a is a service provider for both networks 400b,c. For instance, when each network is a healthcare network, a single healthcare network may correspond to a geographic region such as a state. Although the network 400 is setup at the state level, there may be service providers 410 involved in a state network 400 that provide services to multiple states (i.e., national providers). As an example, the first network 400b may correspond to an Illinois healthcare network. The second network 400c may correspond to a Michigan healthcare network and the first service provider 410a provides healthcare services in both Illinois and Michigan.

When a service provider 410 is involved in multiple networks 400, the broadcaster 500 of that service provider 410 may be configured to communicate with shared storage 440 for each network 400. That is, the broadcaster 500a is able to communicate or publish a first data storage message 502a for the first shared storage 440a of the first network 400b and a second data storage message 502b for the second shared storage 440b of the second network 400c. When a service provider 410 provides services to multiple networks 400, it may accordingly include a set of users 420 specific to each individual network 400. For instance, FIG. 4B illustrates that the first service provider 410 includes three users 420a-c for the first network 400b and two users 420f-g for the second network 400c. In this sense, when an action 432 associated with the first service provider 410a refers to a user 420 of the first network 400b, the broadcaster 500a publishes a first message 502a related to that action 432 to the shared storage 440a of the first network 400a. Similarly, when an action 432 associated with the first service provider 410a refers to a user 420 of the second network 400c, the broadcaster 500a publishes a second message 502b related to that action 432 to the shared storage 440b of the second network 400c. With this approach, in complex systems with multiple networks 400 of overlapping service provider nodes, a broadcaster 500 is scalable to communicate and to ensure data compatibility among networks 400.

Figure 5A:
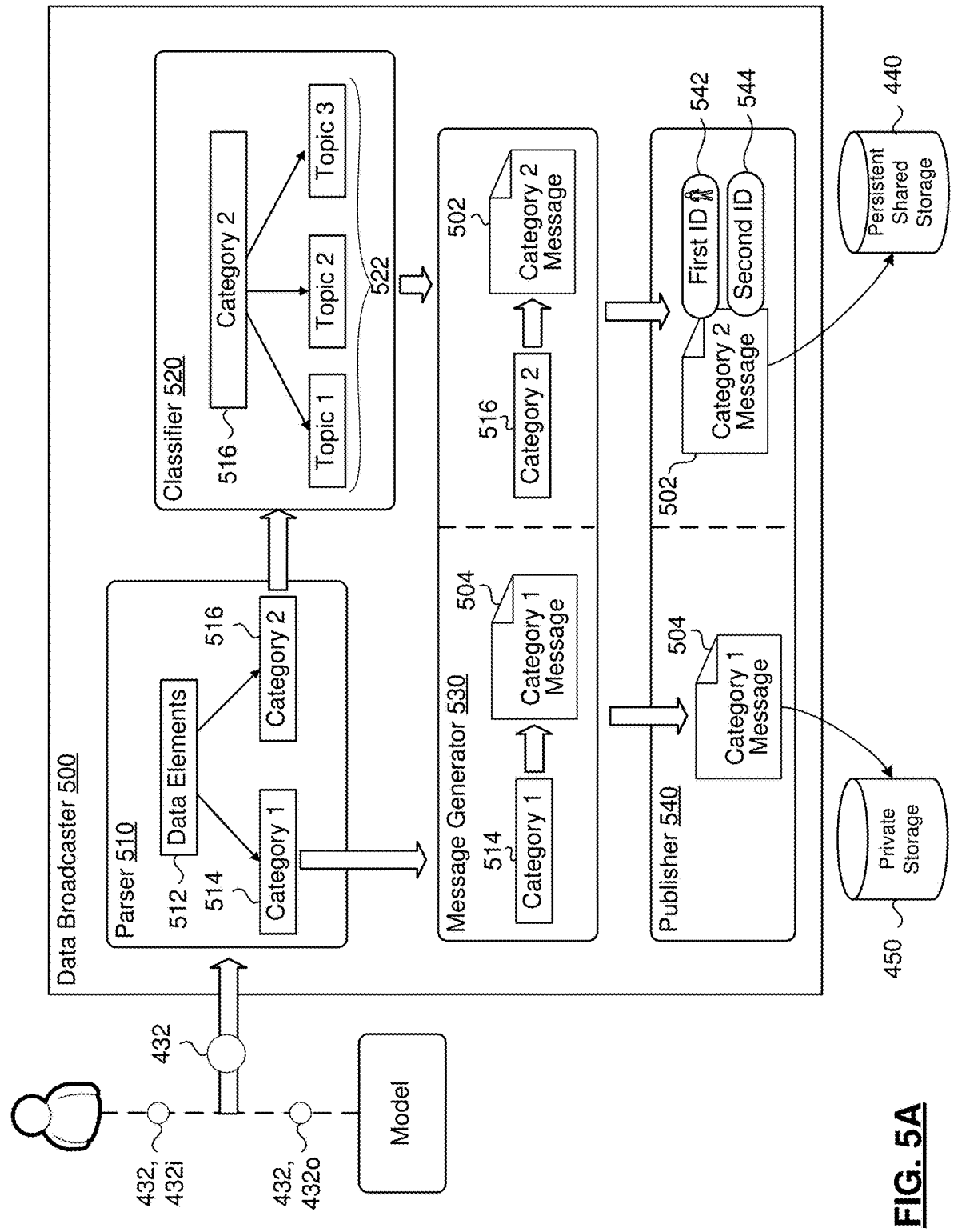
FIG. 5A is a schematic view of an example broadcaster, which may be deployed within the systems of FIGS. 4A and 4B.
Figure 5B:
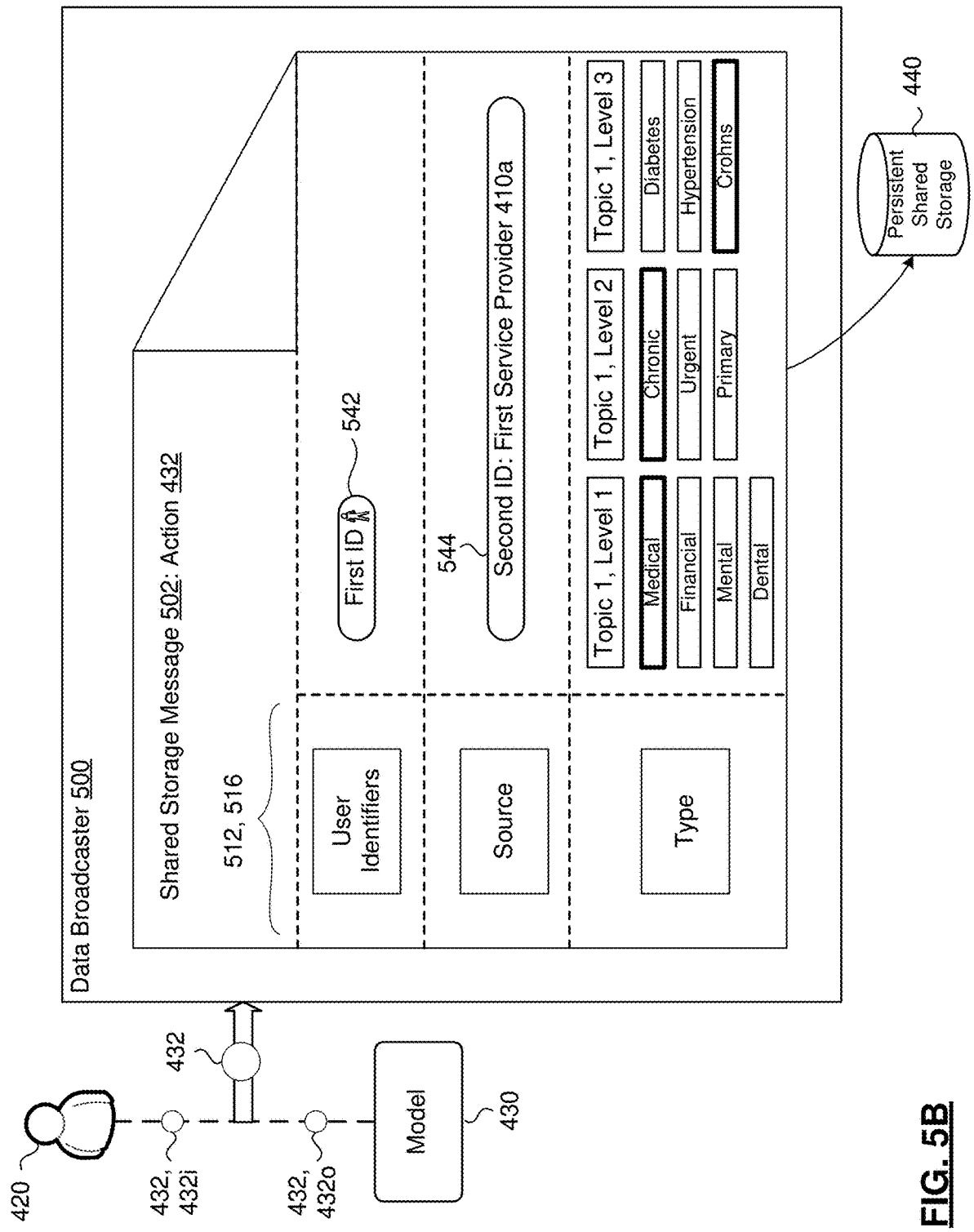
FIG. 5B is a schematic view of another example broadcaster, which may be deployed within the systems of FIGS. 4A and 4B.

Referring to FIGS. 5A and 5B, the broadcaster 500 generally includes a parser 510, a classifier 520, a message generator 530, and a publisher 540. The parser 510 is configured to receive an action 432 targeting a user 420 and to parse data elements 512 associated with the action 432 into at least two sets of data elements 512. A first set of data elements 512 corresponds to a first category 514 of data elements 512 and a second set of data elements 512 corresponds to a second category 516 of data elements 512. In some implementations, the data elements 512 corresponding to the first category 514 and the second category 516 vary depending on the type of action 432. This variance can occur because the broadcaster 500 uses a particular category of data elements 512 to generate a message for a particular storage system. As shown in FIG. 5A, the first category 514 corresponds to data elements 512 that will produce a private storage message 504 while the second category 516 corresponds to data elements 512 that will produce a shared storage message 502.

For any type of action 432, the first category 514 of data elements 512 may include timing information. For instance, when the action 432 is an opportunity action 432o, the timing information may be one or more dates corresponding to different dates associated with the opportunity action 432o. These dates include a date of creation, an effective date, and/or an expiration date. When the action 432 is instead an interaction 432i, the timing information may refer to a date and/or a time when the interaction 432i occurred (e.g., a timestamp).

In a similar manner, for any type of action 432, the first category 514 of data elements 512 may include data elements 512 that are related to or identify the user 420 targeted by the action 432 (e.g., a data structure specific to a user 420). For example, the data elements 512 correspond to personal information (e.g., personal health information) about the target user 420. When the action 432 is an opportunity action 432o, the data elements 512 may be some type of personal information of the user 420 who is provided with the opportunity embodied by the opportunity action 432o. Yet when the action 432 is an interaction 432i, the data elements 512 refer personal information corresponding to the user 420 that is performing the interaction 432i.

Additionally or alternatively, the first category 514 of data elements 512 may include data elements 512 that are specific to the generation of the action 432. That is, when the action 432 is an opportunity action 432o, the data elements 512 that correspond to the generation of the opportunity action 432o may be any type of fact or portion of a fact (e.g., one or more data points) used to generate the opportunity action 432o. For instance, the data elements 512 include values or other descriptive portions of the fact (e.g., clinical values, financial values, medical values, etc.). When the action 432 is an interaction 432i, the data elements 512 may be any data elements that are descriptive of the actual interaction. In some implementations, the data elements 512 of the interactions 432i refer to the data elements 512 that characterize the opportunity that led to the interaction 432i.

In some examples, there are data elements 512 that correspond to the first category 514 that are unique to the type of action 432. For instance, when the action 432 is an opportunity action 432o, the first category 514 can include data elements 512 relating to a status of the opportunity action 432o. As previously stated, the status can correspond to opportunity states such as identified, offered, viewed, rejected, completed, or other status-identifying states. In another example, when the action 432 is an interaction 432i, the first category may include data elements 512 that define the channel or modality through which the interaction 432i took place. That is, when the interaction 432i is an email response by a particular user 420, the channel or modality is electronic mail.

Data elements 512 of the second category 516 are generally similar between different types of actions 432, but may have some slight variation. This second category 516 of data elements 512 impact data stored to the shared storage 440 and therefore can be limited to a few types of data elements 512. These data elements 512 include any user identifiers of the target user 420. These user identifiers are different from, for example, personal information about the user 420 because these types of user identifiers function to provide an identifier for the user 420 without allowing the actual identity of the user 420 to be realized (i.e., maintain anonymity for the actual identity of the user 420). For instance, a user identifier of this type may represent a user 420 as a sequence of numbers or alphanumeric characters. Different entities may assign a unique identifier to a particular user 420. For instance, the service provider 410 that provides services to the user 420 may assign the user 420 a unique identifier when the user enlists with the service provider 410 or procures services from the service provider 410.

In addition to user identifiers, the second category 516 may include data elements 512 that identify the source of the action 432. That is, in the case of an opportunity action 432o, the data elements 512 refer to the service provider 410 who generated and/or published the opportunity action 432o. On the other hand, when the action 432 is an interaction 432i, the source of the interaction 432i is who publishes the interaction 432i.

In some implementations, data elements 512 of the second category 516 also include data elements 512 that identify the type of action 432. The type of action 432 generally refers to a classification of the action 432. In some configurations, the data elements 512 defining the type of action 432 also include reference to product(s) or service(s) related to the action 432. In other words, when on opportunity action 432 is an offer for a particular discount on a product or service, the data elements 512 defining the product of service of that opportunity are included in the second category 516 of data elements 512. Similarly, it is not uncommon for an interaction 432i to also involve a product or service especially when interactions 432 can occur as a result of an opportunity action 432.

In some configurations, the shared storage 440 stores facts about a target user 420 much like how the shared storage 440 stores actions 432. In this respect, a broadcaster 500 may be configured to parse a fact into data elements 512 corresponding to the first category 514 and the second category 516. Facts may therefore be treated similar to actions 432 in that some data elements 512 of a fact may be stored as a private storage message 504 in private storage 450 while other data elements 512 of a fact may be stored as a shared storage message 502 in the shared storage 440. For a fact, the data elements 512 that may be included in the first category 514 are user structural elements (e.g., personal information about the target user 420 of the fact), timing information (e.g., a date of generation for the fact), and other optional fields that include data elements 512 specific to the fact (e.g., values used to form the fact or other descriptive information related to the fact). The data elements 512 that may be included in the second category 516 are similar to other actions 432 and include user identifiers, a source of the fact (e.g., the publisher of the fact), and a type of fact including any data elements 512 referencing a product or a service associated with the fact.

The network 400 may store facts in the shared storage 440 to provide an insight into the actions 432 that occur within the network 400. In other words, the lifecycle of an action 432 and particularly an opportunity action 432o is that, for a particular user 420, one or more service providers 410 establish information regarding the identity of the user 420 including preferences of the user 420 and demographics about the user 420. From this information and any other information, service models 430 or other systems associated with a service provider 410 derive facts that align with the user 420. From one or more facts about a user 420, the service provider 410 generates an opportunity action 432o (e.g., using the service model 430). When the user 420 targeted by the opportunity action 432o receives the underlying opportunity (e.g., offer, discount, recommendation, etc.), the user 420 may then respond by some type of interaction 432i (e.g., accepting an offer, rejecting an offer, ignoring an offer, unsubscribing to offers, etc.). By storing insights into the lifecycle of a user 420 and other service provider 410 activity, other members of the network 400 are able to gain an understanding about a particular user 420 such as a user's implicit tendencies or preferences. When the network 400 corresponds to a healthcare network, understanding these behaviors of a user 420 are valuable in that healthcare can be provided in a manner that aligns with how the user 420 behaves. For instance, a doctor designs a therapy for the user 420 that accounts for the particular habits of the user 420. That is, if the user 420 enjoys exercise, a doctor may incorporate some aspect of exercise into the user's therapy.

Once the parser 510 parses the data elements 512 into the first category 514 and the second category 516, the parser 510 communicates the first set of data elements 512 of the first category 514 to the message generator 530 and the second set of data elements 512 of the second category 516 to the classifier 520. The classifier 520 is configured to receive the second set of data elements 512 parsed into the second category 516 and to classify the data elements 512 of the second set into categories or topics of a data taxonomy 522. The data taxonomy 522 is a structure or framework that includes categories or topics to define a data standardization format that is specific to data being stored at the shared storage 440. Each of these categories or topics may include one or more levels to provide further detail about the attributes of the data elements 512.

To illustrate, FIG. 5B, depicts the data elements 512 of the second category 516 that will form the shared storage message 502 divided into the attributes of user identifiers, source of the action 432, and type of the action 432. Here, the user identifier attribute includes a first identifier indicating the user 420. The source of the action attribute includes a second identifier. As explained in further detail with regard to the enrollment process (e.g., FIG. 6) and the message generation process (e.g., FIG. 7), the second identifier indicates that a respective service provider 410 associated with the action 432 has the authority to publish the data storage message 502 to the shared storage 440. For the type of action attribute, the classifier 520 has built a structure or data taxonomy 522 that includes a single topic and three levels corresponding to that topic. In this example, the first level of the first topic includes broad life topics such as medical health, financial health, emotional/mental health, and dental health. The second level of the first topic refers to the type of care (i.e., more detailed than the first level) and includes care types such as chronic care, urgent care, and primary care. The third level of the first topic refers to the underlying lifelong disease and includes diseases such as diabetes, hypertension, and Crohn's disease.

As illustrated by this example, the data elements 512 of the action 432 may impact the categories of each topic and/or level. Here, when the classifier 520 determined that the action 432 had data elements 512 for a medical topic, the classifier 520 generated (or determined from an established set of category levels) a second level with categories related to the medical topic (i.e., types of medical care) such that the classifier 520 was able to further classify the data elements 512 referring to the level 1 medical category into a "Chronic" level 2. Similarly, when the classifier 520 identifies the level 2 category, the classifier 520 may generate (or determine) level 3 categories or proceed to assess if the data elements 512 also refer to a level 3 category of the data taxonomy 522. Here, the data elements 512 refer to the chronic medical condition known as Crohn's disease and the classifier 520 classifies the data elements 512 accordingly. Therefore with respect to the first topic, the classifier 520 has classified the first set of data elements 512 into a type attribute that refers to the chronic medical condition of Crohn's disease as shown by the darkened outline under each topic/level heading.

Although FIG. 5B only illustrates a single topic with three levels, the data taxonomy 522 may scale to include multiple topics with one or more levels each. For instance, the data taxonomy 522 is a tree-like structure with branches for topic nodes and more detailed branches stemming off of a topic node that branch into topic sub-nodes and sub-categories of the topic sub-nodes. In this respect, the data taxonomy 522 may be configured as complex or as simple as desired for sharing data among the network 400. With this form of data taxonomy 522, the classifier 520 moves through the tree-like structure and compares the data elements 512 of the second category 516 to nodes of the structure and determines whether there is a correlation. When a strong correlation exists during comparison (e.g., the comparison satisfies a particular correlation threshold), the classifier 520 classifies a respective data element 512 or set of data elements according to the node.

The message generator 530 is configured to generate a data storage message 502, 504 for the action 432. The data storage message 502, 504 may be a shared storage message 502 or a private storage message 504 depending on the category 514, 516 of data elements 512 received by the message generator 530. Moreover, as shown in FIG. 5A, a single action 432 may contain data elements 512 that result in the formation of both a shared storage message 502 and a private storage message 504 by the message generator 530 for the same action 432. When the message generator 530 receives the first category 514 of data elements 512 from the parser 510, the message generator 530 generates the private storage message 504. Here, the private storage message 504 may not be restricted to a certain format or data taxonomy 522. Therefore, the message generator 530 may generate the private storage message 504 with limited adaptation of the data elements 512 of the first category 514. In some examples though, the private storage 450 has a particular data storage structure and the message generator 530 generates the private storage message 504 to comply with the particular data storage structure of the private storage 450.

On the other hand, when the message generator 530 receives the second set of data elements 512 classified into the categories of the data taxonomy 522 from the classifier 520, the message generator 530 generates a shared storage message 502 such that it includes a structure complying with the data taxonomy 522. For instance, the message generator 530 packages the data elements 512 classified into the categories of the data taxonomy 522 from the classifier 520 into a data block to form the shared storage message 502. This enables the shared storage message 502 to be passed to the publisher 540 and published to the shared storage 440 in compliance with storage structure for a data record at the shared storage 440.

In some implementations, when the publisher 540 publishes the shared storage message 502 to the shared storage 440, the publisher 540 includes identifiers that function to provide certain message sharing indications. In some examples, the publisher 540 includes the first identifier 542 indicating that the shared storage message 502 concerns a particular user 420 (i.e., the user 420 targeted or associated with the action 432 forming the message 502) and a second identifier 544 indicating the source of the shared storage message 502 (e.g., the service provider 410 responsible for the action 432 forming the shared storage message 502). The second identifier 544, besides indicting the source of the shared storage message 502 may also indicate that the source of the shared storage message 502 has the authority to publish the shared storage message 502 to the shared storage 440 (e.g., via the publisher 540 of the broadcaster 500).

Figure 6:
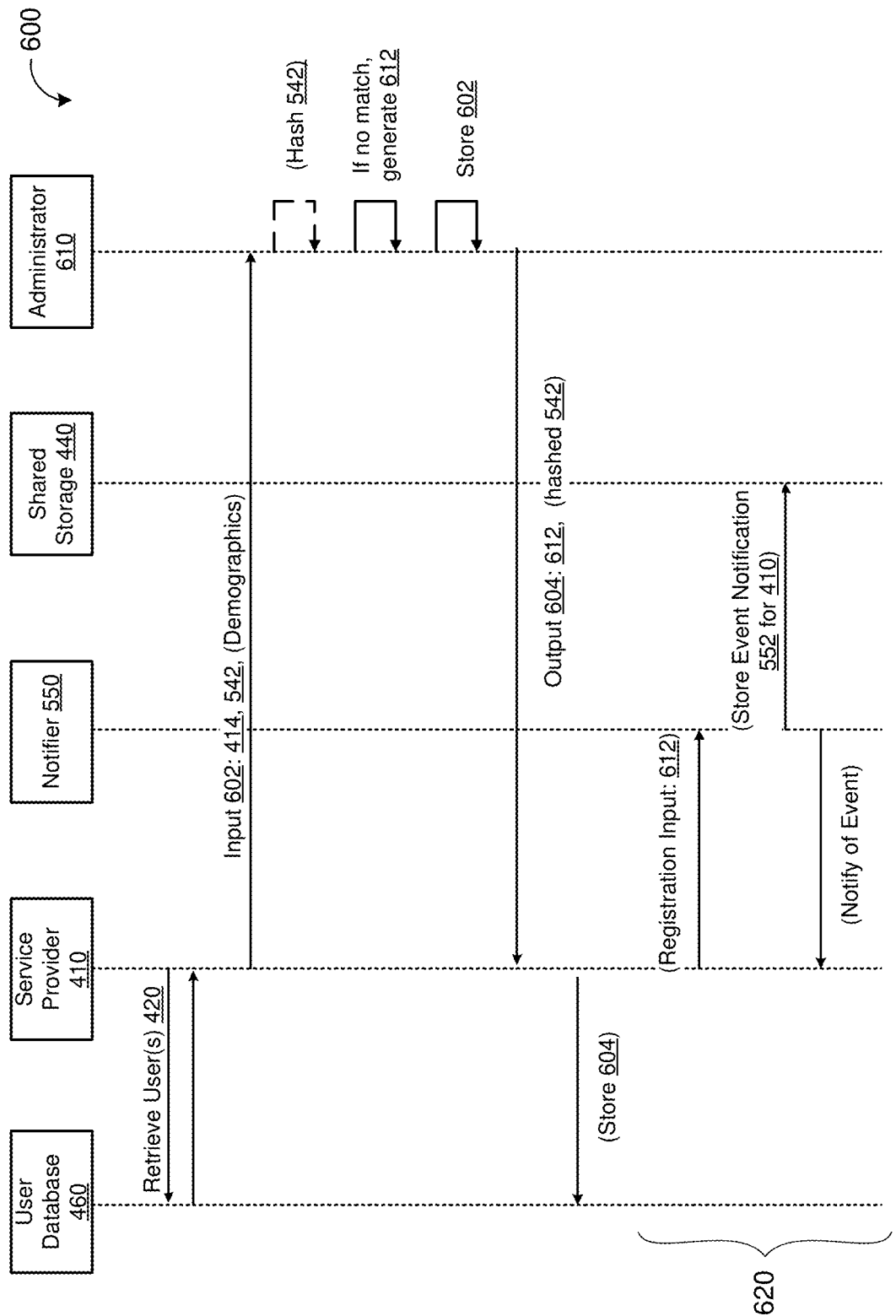
FIG. 6 is a flow diagram of an example enrollment process for broadcasting data within the systems of FIGS. 4A and 4B.

Referring to FIG. 6, to participate in the data sharing ecosystem of the network 400 (i.e., to access the shared storage 440), each service provider 410 registers or enrolls their associated users 420 with the network 400 (i.e., an enrollment process 600). In some examples, in order for data information concerning a particular user 420 to be shared (e.g., stored in the shared storage 440 and/or obtainable by other entities), a service provider 410 first enrolls that user 420 with the private storage 450 (e.g., shown as the user database 460). Here, an entity of the network ecosystem or some third party may be responsible for administration of the private storage 440. This entity is referred to as an administrator 610. When the service provider 410 enrolls one of its users 420, the service provider 410 may initially retrieve information regarding the user 420 from a user database 460 associated with the service provider 410 (e.g., from the private storage 450). In some examples, the retrieved information includes a user identifier 542 (e.g., the first identifier 542). Additionally, the retrieved information includes demographics about the user 420. To enroll the user 420, the service provider 410 then provides an enrollment input 602 to the administrator 610. In some examples, such as FIG. 6, the enrollment input 602 includes the retrieved information (e.g., the user identifier 542 and optionally the demographics) along with a service provider identifier 414. The service provider identifier 414, much like the user identifier 542, refers to a unique identifier generated for the service provider 410. The service provider identifier 414 may be a unique identifier issued by the network 400 (e.g., a network administrating entity or the administrator 610) when the service provider 410 joins or registers with the network 400. In some examples, the service provider identifier 414 corresponds to a government-issued business identifier for the service provider 410. For instance, the service provider identifier 414 is the federal employer identification number (EIN) or the federal tax identification number issued by the Internal Revenue Service (IRS).

When the administrator 610 receives the enrollment input 602 (e.g., the user identifier 542 and the service provider identifier 414 along with optionally the demographics), the administrator 610 checks this input 602 to determine if the combination of the user 420 and the service provider 410 have already undergone the enrollment process 600. If the service provider 410 has already enrolled the user 420, the administrator 610 would have already issued a sharing identifier 612 for the user 420 to that particular service provider 410. In other words, the enrollment process 600 generates the sharing identifier 612 as a unique identifier that serves to authorize the service provider 410 to publish information about a particular user 420 to the shared storage 440. Generally speaking, the administrator 610 may check to see if the combination of the user 420 and the service provider 410 have already undergone the enrollment process 600 to ensure that the sharing identifier 612 remains unique to the network 400. Therefore, when the administrator 610 determines that the user 420 with respect to the service provider 410 fails to be enrolled in the network 400, the administrator 610 generates the sharing identifier 612.

In some configurations, the administrator 610 does not store sharing identifiers 612, but rather returns each sharing identifier 612 to the corresponding service provider 410 (e.g., for the service provider 410 to store) as an enrollment output 604. Instead, in these configurations, the administrator 610 stores the enrollment input 602 (e.g., the user identifier 542 in combination with the service provider identifier 414) after issuing the sharing identifier 612. Therefore, if storage associated with the administrator 610 includes the enrollment input 602 (e.g., the combination of identifiers 542, 414), the administrator 610 can confidently conclude that a sharing identifier 612 has already been generated (i.e., the enrollment process 600 has already occurred).

The enrollment process 600 may include optional aspects that are depicted in parenthesis in FIG. 6. For instance, because the enrollment input 602 may include the demographics, the demographics are shown in a parenthetical. Similarly, the network 400 may prefer to provide a level of obfuscation for the fact that a particular user 420 is associated with a particular service provider 410 and therefore the user identifier 542 (e.g., issued by the service provider 410 to the user 420) is hashed by the administrator 610 during the enrollment process 600. When the administrator 610 hashes the user identifier 542, the hashed user identifier can then be shared across service providers 410 while providing additional anonymity to the user 420. In situations where the administrator 610 generates the hashed user identifier during the enrollment process 600, the hashed user identifier may be subsequently used with the sharing identifier 612 by the publisher 540. That is, instead of publishing the shared storage message 502 with the user identifier 542, the publisher 540 publishes the shared storage message 502 with the hashed user identifier. FIG. 6 also depicts that when the administrator 610 generates the enrollment output 604, the administrator 610 returns the enrollment output 604 to the service provider 410 who can, in turn, store the output 604 at the service provider database 460.

Referring further to FIG. 6, the enrollment process 600 may also include an event registration portion 620. During the event registration portion 620, the service provider 410 identifies the type of actions 432 to be notified for the user 420 undergoing the enrollment process 600. Here, the service provider 410 may register for any and all types of actions 432 by communicating the sharing identifier 612 to a notifier 550 of the broadcaster 500. The notifier 550 (although not shown in FIGS. 5A and 5B) is a module associated with the broadcaster 500 that is configured to generate an event notification 552. The notifier 550 is able to then communicate the event notification 552 (e.g., that includes the sharing identifier 612) to the shared storage 440 where it can then be subsequently stored. Thereafter, when the shared storage 440 receives a shared storage message 502 regarding a type of action 432 targeting the user 420 who is subject of the event notification 552, the shared storage 440 may operate to share or aid in the sharing of the shared storage message 502. In this situation, since the event registration included the sharing identifier 612 from which the underlying user 420 and associated service provider 410 can be derived, the notifier 550 and/or the shared storage 440 is able to identify that a shared storage message 502 targets a particular user 420 who is the same user 420 subject to an event notification 552 and notify the service provider 410 who initiated the event notification 552 (e.g., via the notifier 550). In some examples, the notifier 550 notifies the service provider 410 who initiated the event notification 552 by communicating the shared storage message 504 that triggered the notification or by directing the service provider 410 to the shared storage 440 where the shared storage message 504 has been stored.

In some examples, some portion of the functionality of the broadcaster 500 may be incorporated with the shared storage 440. That is, the broadcaster 500 does not need to reside in whole with the service provider 410, but instead may be integrated with the shared storage 440. For instance, the shared storage 440 includes the functionality of the notifier 550 such that when the shared storage 440 receives messages 502 triggering an event notification 552, the notifier 550 at or associated with the shared storage 440 notifies the proper service provider(s) 410.

FIG. 7 is an example of a data sharing process 700. Since the data sharing process 700 can vary depending on the type of action 432 being published or shared, the first portion 710 of the sharing process 700 refers to the publishing/sharing of opportunity actions 432o while the second portion 720 of the sharing process 700 refers to the publishing/sharing of interactions 432i. As previously stated, the service provider 410 publishes the shared storage message 502 using the publisher 540 of the broadcaster 500. The shared storage message 502 published by the publisher 540 includes the first identifier 542 as the user identifier attribute, the second identifier 544 as the source attribute, and the appropriate data taxonomy 522 based on the action's data elements 512. When the user identifier 452 is a hashed user identifier, the shared storage message 502 may include the hashed user identifier. In some examples, the sharing identifier 612 functions as the second identifier 544 discussed previously.

In the case of an opportunity action 432o, the publisher 540 may additionally include an opportunity identifier with the shared storage message 502. The opportunity identifier, or more generally referred to as an action identifier, may function as a reference such that, if a subsequent interaction 432i occurs in response to the opportunity action 432o, the inclusion or reference to the opportunity identifier indicates that the subsequent interaction 432i is related to opportunity action 432o of the opportunity identifier.

When shared storage 440 stores a shared storage message 502, the shared storage 440 acknowledges the successful storage by responding to the service provider 410 who published the shared storage message 502 with an acknowledgement 712. In addition to the service provider 410 that initiated the publication of the shared storage message 502, the shared storage 440 also may acknowledge the notifier 550. Once the notifier 550 receives the acknowledgement 712, the notifier 550 determines any service providers 410a-n that have expressed interest in the parties involved with the message 502 (e.g., the service provider 410 that published the message 502 and/or user 420 who is the subject of the message 502). In some examples, the notifier 550 determines interested parties by determining which entities have event notifications 552 requesting to be notified when a particular attribute is present in a shared storage message 502. In this respect, the notifier 550 may examine the data taxonomy 522 and/or the sharing identifier 612 associated with the message 502 and compare those components to event notifications 552 (e.g., that may include a matching sharing identifier 612 or type of action 432). For each interested party identified by the notifier 550, the notifier 550 may notify the interested parties. For example, the notifier 550 notifies a respective interested party by communicating the message 502, attributes of the message 502, and/or directing the interested party to the record storing the information of the message 502 at the shared storage 440.

The second portion 720 of the sharing process 700 that refers to the publishing/sharing of interactions 432i occurs in a similar manner to the first portion 710. In the second portion 720, the message 502 corresponding to an interaction 432i does not include an interaction identifier, but rather may refer to an opportunity identifier for the opportunity action 432o that resulted in the interaction 432i generating the message 502. Moreover, the data taxonomy 522 of the message 502 will be that of an interaction 432i as mentioned previously rather than an opportunity action 432o. When the message 502 for an interaction 432i includes the opportunity identifier, the shared storage 440 identifies the opportunity action 432o corresponding to the opportunity identifier and communicates the taxonomy 522 of the message 502 defining the corresponding opportunity action 432o to the notifier 550. In some examples, the communicating of the taxonomy 522 of the message 502 defining the corresponding opportunity action 432o to the notifier 550 functions as a form of acknowledgement that the message 502 about the interaction 432i was successfully stored at the shared storage 440. Much like the first portion 710 of the sharing process 700, an acknowledgement may also be sent to the service provider 410 that published the message 502 corresponding to the interaction 432i.

With the taxonomy 522 of the opportunity action 432o referenced by the message 502 for the interaction 432i, the notifier 550 is able to determine which parties are interested in knowing about the message 502 for the interaction 432i. Here, the notifier 550 determines the interested parties in similar manner to the first portion 710. In other words, the notifier 550 may examine the data taxonomy 522 and/or the sharing identifier 612 associated with the message 502 and compare those components to event notifications 552 (e.g., that may include a matching sharing identifier 612 or type of action 432). For each interested party identified by the notifier 550, the notifier 550 may notify the interested parties. For example, the notifier 550 notifies a respective interested party by communicating the message 502 for the interaction 432i, attributes of the message 502 for the interaction 432i, and/or directing the interested party to the record storing the information of the message 502 for the interaction 432i at the shared storage 440.

In some examples, for the first portion 710 and/or the second portion 720 of the sharing process 700, the notifier 550 collaborates with the private storage 450 or an entity administering the private storage 450 to determine any parties that are interested in the message 502 published at the shared storage 440. Here, the entity administering the private storage 450 may be the same as the administrator 610 or a different entity. When collaborating with the private storage 450, the entity administering the private storage 450 may identify the interested parties for the notifier 550 and inform the notifier 550 of the interested parties by communicating the service provider identifiers 414 of the interested parties to the notifier 550. With the one or more service provider identifiers 414 of interested parties from the private storage 450, the notifier 550 proceeds to notify these parties.

Figure 8A:
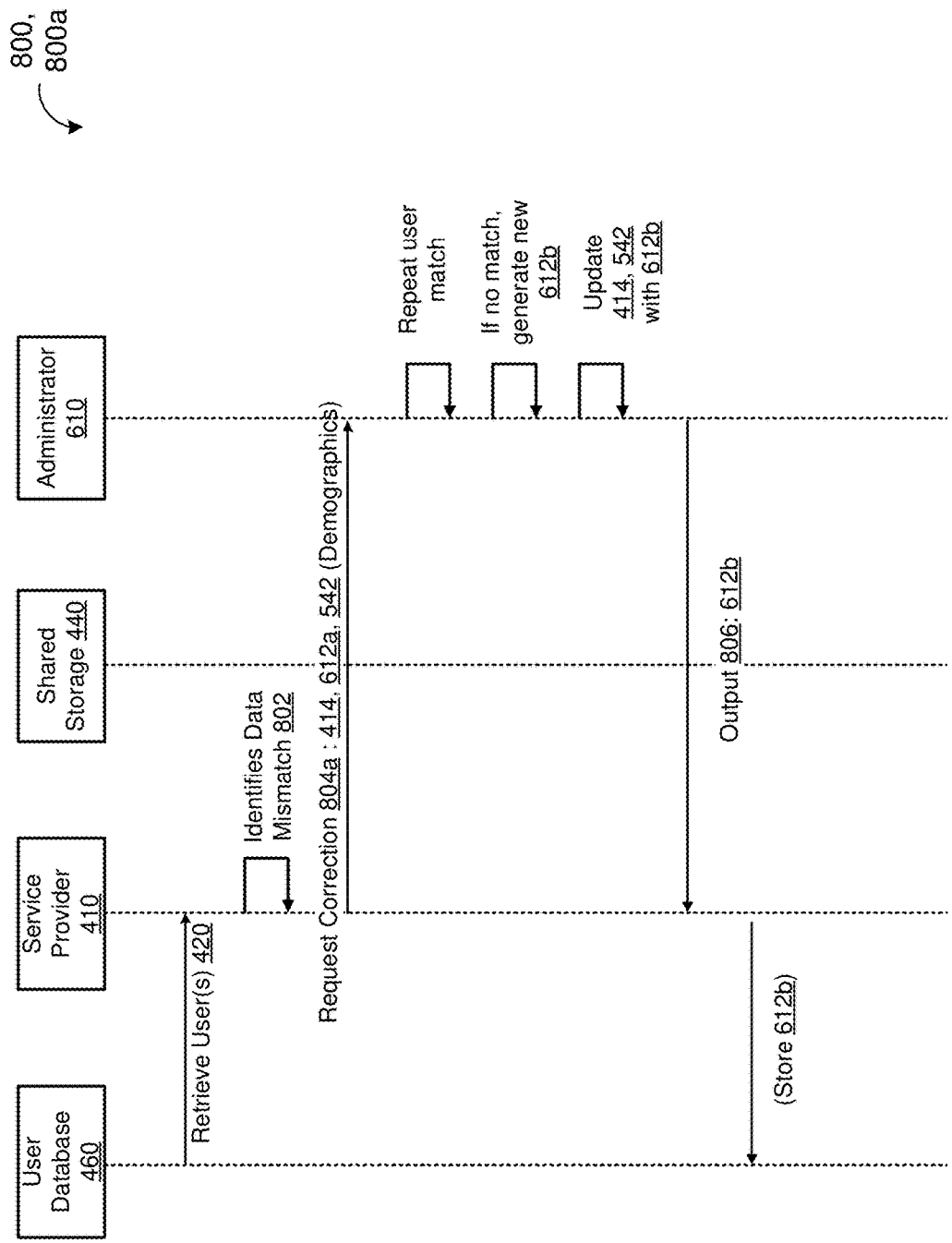

FIGS. 8A and 8B are examples of data correction processes 800, 800a-b. With a network 400 having multiple service providers 410 and often multiple users 420 for each service provider 410, it is almost inevitable that some data becomes mismatched especially when different data processes (e.g., processes 600-700) occur based on particular identifiers. One such issue that can occur is that a particular user 420 is improperly identified in a given process (referred to as a user mismatch). When a user mismatch occurs, the first correction process 800, 800a of FIG. 8A resolves the mismatch at the network level while the second correction process 800, 800b of FIG. 8B resolves the mismatch at the service provider level.

Two situations that may occur regarding mismatch are that (1) two user identifiers 542 that should not match (i.e., correspond to different users 420) are perceived to match and (2) two user identifiers 542 that should have matched (i.e., correspond to the same user 420) are not perceived to match. When the first situation occurs, the enrollment process 600 generates a single sharing identifier 612 when actually two sharing identifiers 612 are needed (referred to as a "split"), one for each user 420 that actually exists. In contrast, when the second situation occurs, the enrollment process 600 generates two sharing identifiers 612 for the two mismatching user identifiers 542 even though the two mismatching user identifiers 542 actually correspond to a single user 420. In this second situation, the two sharing identifiers 612 need to be merged into a single sharing identifier 612 to be consistent with the single user 420. When either of these situations occur, the first data correction process 800a of FIG. 8A or the second data correction process 800b of FIG. 8B is able to resolve the mismatch issue.

During the first data correction process 800a shown in FIG. 8A, a service provider 410 determines that there is a data mismatch 802 present. In response to this mismatch 802 being present, the service provider 410 requests a first correction 804, 804a by the administrator 610. In some examples, such as FIG. 8A, the correction request 804 includes the user identifier 542, the service provider identifier 414, and the existing sharing identifier 612, 612a. The correction request 804a may additionally include the demographics of the user 420.

Upon receipt of the correction request 804a, the administrator 610 repeats the user match. When the administrator 610 determines that there fails to be a match for the user 420 (i.e., the combination of the user 420 and the service provider 410 does not exist at the administrator 610), the administrator 610 generates a new sharing identifier 612, 612b for the user 420 of the service provider 410. Stated differently, the administrator 610 determines that the user 420 identified by the correction request 804a with respect to the identifier service provider 410 is not enrolled with the network 400 and generates a sharing identifier 612 (i.e., the new sharing identifier 612b) for the user 420 of the service provider 410. The administrator 610 may then update the combination of the user identifier 542 and the service provider identifier 414 to indicate the new sharing identifier 612b. The administrator 610 is also configured to communicate the new sharing identifier 612b as a correction output 806 to the service provider 410 that identified the mismatch 802 and submitted the correction request 804a. With the new sharing identifier 612b, the service provider 410 may instruct the user database 460 to store the new sharing identifier 612b to use in other network processes. In the situation where there are actually two users 420 and there should be a sharing identifier 612 for each user 420, this sequence of the data correction process 800a would occur for each user 420.

The second data correction process 800b of FIG. 8B differs from the first data correction process 800a in that the service provider 410 invalidates the data corresponding to the user 420 prior to generating a second correction request 804, 804b. For example, the user database 460 associated with the service provider 410 identifies the data mismatch 802 and initiates a split or merge operation to commence the second data correction process 800b. At this point, the existing user identifier 542, 542a is invalid and passed along to the service provider 410 to be included in the second correction request 804b to the administrator 610.

In some examples, such as FIG. 8B, the second correction request 804b includes the service provider identifier 414, the invalid user identifier 542a, a new user identifier 542, 542b, the invalid sharing identifier 612, 612a, and optionally new demographics of the user 420. Here, the second correction request 804b is able to include the new user identifier 542b (and the new demographics) because the service provider 410 may be the entity that is responsible for issuing the user identifier 542 and generating the demographics for the user 420. Much like the first correction process 800a, the second correction process 800b determines if there is a match with the user 420 based on the second correction request 804b. That is, the administrator 610 determines whether the new user identifier 542b with respect to the service provider identifier 414 corresponds to an existing sharing identifier 612. When there fails to be an existing sharing identifier 612, the administrator 610 determines that the user 420 fails to be enrolled in the network 400 in relation to the service provider 410 and generates a new sharing identifier 612b for the user 420 with respect to the service provider 410.

Following the generation of the new sharing identifier 612b, the administrator 610 replaces any records with the invalid user identifier 542a with the new user identifier 542b associated with the new sharing identifier 612b (and the new demographics). Additionally, the second correction process 800b may hash the new user identifier 542b at the administrator 610 to provide a level of obfuscation for the user 420. After generating the new sharing identifier 612b, the administrator 610 communicates as output 806, the new sharing identifier 612b to the service provider 410. Here, the service provider 410 may store the new sharing identifier 612b in the user database 460 associated with the service provider 410.

Figure 9:
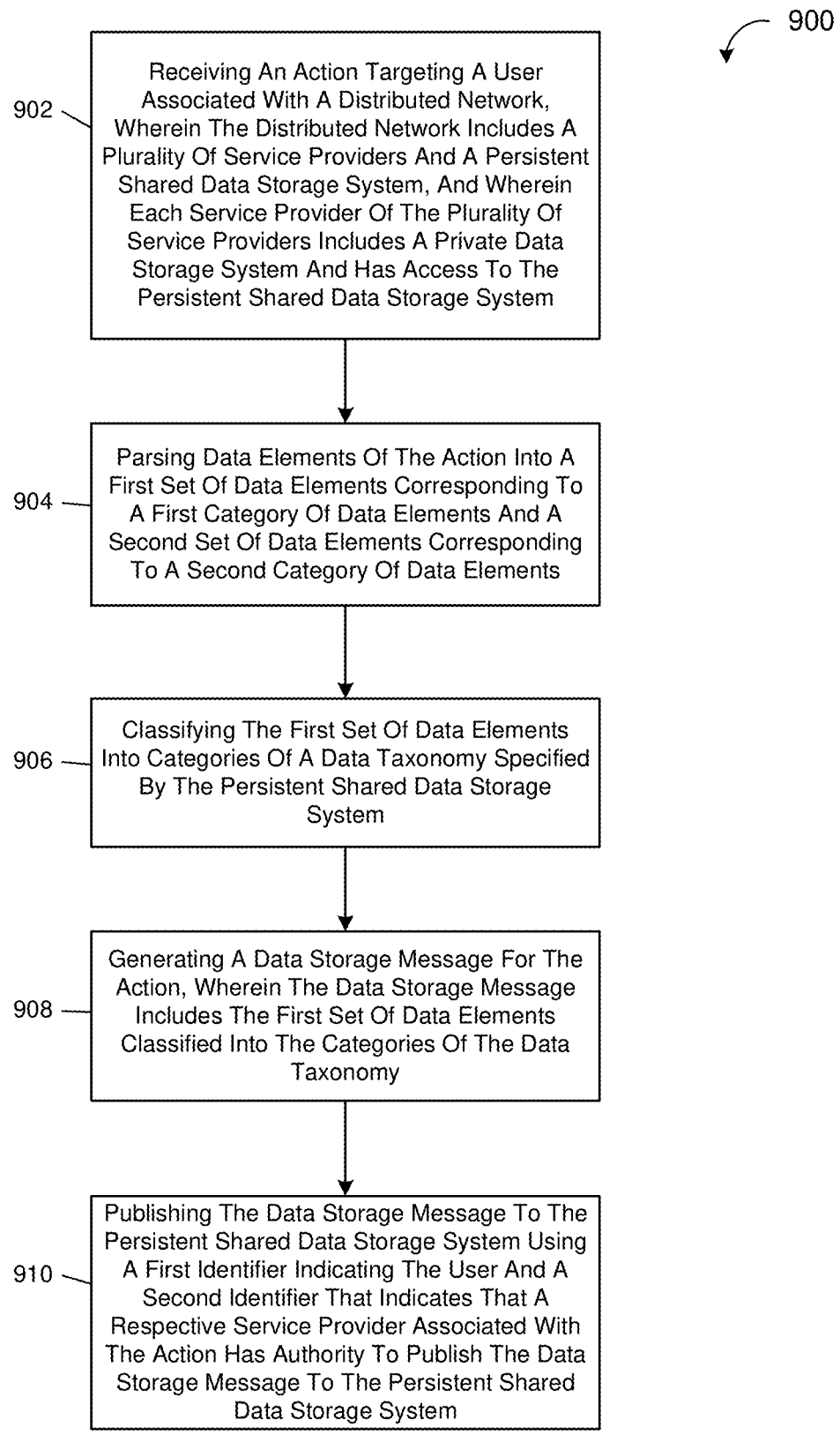
FIG. 9 is a flow diagram of an example method of broadcasting data for the systems of FIGS. 4A and 4B.

FIG. 9 is an example of a flow diagram for a method 900 of broadcasting data for the network 400. At operation 902, the method 900 receives an action 432 targeting a user 420 associated with a distributed network 400. The distributed network 400 includes a plurality of service providers 410a-n and a persistent shared data storage system 440. Each service provider 410 of the plurality of service providers 410a-n includes a private data storage system 450 and has access to the persistent shared data storage system 440. At operation 904, the method 900 parses data elements 512 of the action 432 into a first set of data elements 512 corresponding to a first category 516 and a second set of data elements 512 corresponding to a second category 514.

At operation 906, the method 900 classifies the first set of data elements 512 into categories of a data taxonomy 522 specified by the persistent shared data storage system 440. At operation 908, the method 900 generates a data storage message 502 for the action 432. The data storage message 502 includes the first set of data elements 512 classified into the categories of the data taxonomy 522. At operation 910, the method 900 publishes the data storage message 502 to the persistent shared data storage system 440 using a first identifier 542 that indicates that a respective service provider 410 associated with the action 432 has authority to publish the data storage message 502 to the persistent shared storage system 440.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system comprising:
   data processing hardware; and
   memory hardware, wherein the memory hardware is configured to store instructions that, when executed by the data processing hardware, cause the data processing hardware to perform operations, and wherein the operations include:
   receiving an action targeting a user associated with a distributed network, wherein:
      the distributed network includes a plurality of service providers and a persistent shared data storage system, and
      each service provider of the plurality of service providers includes a private data storage system and has access to the persistent shared data storage system;
   parsing data elements of the action to offload at least some of the data elements into the private data storage system associated with a respective service provider to minimize storage in the persistent shared data storage system by:
      parsing the data elements of the action into a first set of data elements corresponding to a first category of data elements and a second set of data elements corresponding to a second category of data elements, wherein:
         the first category of data elements corresponds to data elements that produce a private storage message, and
         the second category of data elements corresponds to data elements that produce a shared storage message;
      classifying the first set of data elements into categories of a data taxonomy specified by the persistent shared data storage system;
      generating a data storage message for the action, wherein the data storage message includes the first set of data elements classified into the categories of the data taxonomy; and
      publishing the data storage message to the persistent shared data storage system using a first identifier indicating the user and a second identifier that indicates that the respective service provider associated with the action has authority to publish the data storage message to the persistent shared data storage system.

2. The system of claim 1, wherein the operations further include:
   communicating, to an entity facilitating the persistent shared data storage system, a service provider identifier associated with the respective service provider and the first identifier; and
   in response to the entity determining that the user indicated by the first identifier fails to be enrolled in the distributed network, receiving the second identifier, and wherein the second identifier further indicates that the respective service provider has the authority to publish to the persistent shared data storage system on behalf of the user.

3. The system of claim 2, wherein the first identifier also indicates an association between the respective service provider and the user.

4. The system of claim 1, wherein the first identifier is issued by the respective service provider.

5. The system of claim 1, wherein the operations further include:
   generating a second data storage message for the action, wherein the second data storage message includes the second set of data elements; and
   communicating the second data storage message to the private data storage system associated with the respective service provider.

6. The system of claim 1, wherein the data storage message published to the persistent shared data storage system is broadcasted to each service provider of the plurality of service providers enrolled to receive data storage messages published to the persistent shared data storage system targeting the user.

7. The system of claim 1, wherein:
   the action is generated by a healthcare service provider of the plurality of service providers;
   the action corresponds to a proposed improvement in at least one of a set of medical services and a set of medical goods provided to the user by the healthcare service provider; and
   the healthcare service provider is associated with the respective service provider.

8. The system of claim 7, wherein the action is performed in response to a prior action provided to the user by the respective service provider.

9. The system of claim 7, wherein:
the action is associated with an opportunity action for the user; and
the opportunity action includes a status state that tracks or identifies interaction by the user with the opportunity action.

10. The system of claim 9, wherein the status state includes at least one of:
an identified status that indicates an existence of an opportunity action for the user;
an offered status that indicates the opportunity action has been presented to the user;
a viewed status that indicates the user has seen the opportunity action;
a rejected status that indicates the user has taken an affirmative action to deny the opportunity action;
a completed status to indicate the user has reached an intended outcome or the opportunity action has reached its end of life; and
an expired status that indicates the opportunity action is no longer available to the user.

11. The system of claim 1, wherein:
the operations further include assigning an action identifier to the action; and
the data storage message further includes the action identifier.

12. The system of claim 1, wherein the first category of data elements corresponds to at least one of personal information and personal health information associated with the user.

13. A computerized method comprising:
receiving an action targeting a user associated with a distributed network, wherein:
the distributed network includes a plurality of service providers and a persistent shared data storage system, and
each service provider of the plurality of service providers includes a private data storage system and has access to the persistent shared data storage system;
parsing data elements of the action to offload at least some of the data elements into the private data storage system associated with a respective service provider to minimize storage in the persistent shared data storage system to optimize sharing of the action between the plurality of service providers by:
parsing the data elements of the action into a first set of data elements corresponding to a first category of data elements and a second set of data elements corresponding to a second category of data elements, wherein:
the first category of data elements corresponds to data elements that produce a private storage message, and
the second category of data elements corresponds to data elements that produce a shared storage message;
classifying the first set of data elements into categories of a data taxonomy specified by the persistent shared data storage system;
generating a data storage message for the action, wherein the data storage message includes the first set of data elements classified into the categories of the data taxonomy; and publishing the data storage message to the persistent shared data storage system using a first identifier indicating the user and a second identifier that indicates that the respective service provider associated with the action has authority to publish the data storage message to the persistent shared data storage system.

14. The computerized method of claim 13, further including:
communicating, to an entity facilitating the persistent shared data storage system, a service provider identifier associated with the respective service provider and the first identifier; and
in response to the entity determining that the user indicated by the first identifier fails to be enrolled in the distributed network, receiving the second identifier, and wherein the second identifier further indicates that the respective service provider has the authority to publish to the persistent shared data storage system on behalf of the user.

15. The computerized method of claim 14, wherein the first identifier also indicates an association between the respective service provider and the user.

16. The computerized method of claim 13, wherein the first identifier is issued by the respective service provider.

17. The computerized method of claim 13, further including:
generating a second data storage message for the action, wherein the second data storage message includes the second set of data elements; and
communicating the second data storage message to the private data storage system associated with the respective service provider.

18. The computerized method of claim 13, wherein the data storage message published to the persistent shared data storage system is broadcasted to each service provider of the plurality of service providers enrolled to receive data storage messages published to the persistent shared data storage system targeting the user.

19. The computerized method of claim 13, wherein:
the action is generated by a healthcare service provider of the plurality of service providers;
the action corresponds to a proposed improvement in at least one or a set of medical services and a set of medical goods provided to the user by the healthcare service provider; and
the healthcare service provider is associated with the respective service provider.

20. The computerized method of claim 13, wherein the action corresponds to an interaction between the respective service provider and the user.

21. The computerized method of claim 13, wherein the action is performed in response to a prior action provided to the user by the respective service provider.

22. The computerized method of claim 13, further comprising:
assigning an action identifier to the action,
wherein the data storage message further includes the action identifier.

* * * * *